(12) United States Patent
Fang et al.

(10) Patent No.: US 9,722,497 B2
(45) Date of Patent: Aug. 1, 2017

(54) SYSTEMS AND METHODS FOR ADJUSTING FREQUENCIES AND CURRENTS BASED ON LOAD CONDITIONS OF POWER CONVERSION SYSTEMS

(71) Applicant: ON-BRIGHT ELECTRONICS (SHANGHAI) CO., LTD., Shanghai (CN)

(72) Inventors: Lieyi Fang, Shanghai (CN); Chao Yao, Shanghai (CN); Xiuhong Zhang, Shanghai (CN); Yunchao Zhang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 14/830,603

(22) Filed: Aug. 19, 2015

(65) Prior Publication Data
US 2016/0043649 A1 Feb. 11, 2016

Related U.S. Application Data

(63) Continuation of application No. 14/019,373, filed on Sep. 5, 2013, now Pat. No. 9,154,038.

(30) Foreign Application Priority Data

Aug. 29, 2013 (CN) .......................... 2013 1 0386241

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 3/33507* (2013.01); *H02M 2001/0009* (2013.01)

(58) Field of Classification Search
CPC .................................................... H02M 3/335
See application file for complete search history.

(56) References Cited

U.S. PATENT DOCUMENTS 5,568,044 A 10/1996 Bittner
5,729,448 A 3/1998 Haynie et al.
(Continued)

FOREIGN PATENT DOCUMENTS

CN 1841893 A 10/2006
CN 1917322 A 2/2007
(Continued)

OTHER PUBLICATIONS

Chinese Patent Office, Office Action mailed Nov. 14, 2013, in Application No. 201110224933.5.
(Continued)

*Primary Examiner* — Emily P Pham
(74) *Attorney, Agent, or Firm* — Jones Day

(57) ABSTRACT

Systems and methods are provided for regulating a power conversion system. An example system controller includes a driving component and a detection component. The driving component is configured to output a driving signal to a switch associated with a first current flowing through a primary winding of a power conversion system, the switch including a first switch terminal related to a first voltage and a second switch terminal related to a second voltage, the driving signal being associated with a plurality of switching periods. The detection component is configured to receive an input signal associated with a difference between the first voltage and the second voltage, detect at least one valley of the input signal in magnitude during a detection period for the first switching period, and output a detection signal based on at least information associated with the input signal to affect the driving signal.

42 Claims, 16 Drawing Sheets

(56) References Cited

U.S. PATENT DOCUMENTS

| | | | |
|---|---|---|---|
| 6,556,478 B2 | 4/2003 | Willis et al. | |
| 6,713,995 B2 | 3/2004 | Chen | |
| 6,798,086 B2 | 9/2004 | Utsunomiya | |
| 6,954,056 B2 | 10/2005 | Hoshino et al. | |
| 6,972,548 B2 | 12/2005 | Tzeng et al. | |
| 7,054,169 B2 | 5/2006 | Huh et al. | |
| 7,173,404 B2 | 2/2007 | Wu | |
| 7,262,587 B2 | 8/2007 | Takimoto et al. | |
| 7,265,999 B2 | 9/2007 | Murata et al. | |
| 7,310,247 B1* | 12/2007 | Lin | H02M 3/33592 363/131 |
| 7,456,623 B2 | 11/2008 | Hasegawa et al. | |
| 7,522,431 B2 | 4/2009 | Huynh et al. | |
| 7,605,576 B2 | 10/2009 | Kanakubo | |
| 7,826,237 B2 | 11/2010 | Zhang et al. | |
| 7,898,825 B2 | 3/2011 | Mulligan et al. | |
| 7,952,895 B2 | 5/2011 | Matthews | |
| 8,339,814 B2 | 12/2012 | Zhang et al. | |
| 8,363,428 B2* | 1/2013 | Moon | H02M 3/33507 363/21.03 |
| 8,630,103 B2 | 1/2014 | Baurle et al. | |
| 8,693,217 B2 | 4/2014 | Mao | |
| 8,879,289 B2 | 11/2014 | Lin et al. | |
| 9,154,038 B2 | 10/2015 | Fang et al. | |
| 9,584,025 B2 | 2/2017 | Lin et al. | |
| 2002/0080631 A1 | 6/2002 | Kanouda et al. | |
| 2003/0042879 A1 | 3/2003 | Huh et al. | |
| 2005/0116697 A1 | 6/2005 | Matsuo et al. | |
| 2005/0222646 A1 | 10/2005 | Kroll et al. | |
| 2006/0273772 A1 | 12/2006 | Groom | |
| 2007/0273345 A1 | 11/2007 | Chen et al. | |
| 2008/0031015 A1 | 2/2008 | Na et al. | |
| 2008/0061754 A1 | 3/2008 | Hibi | |
| 2008/0130324 A1 | 6/2008 | Choi et al. | |
| 2008/0225563 A1 | 9/2008 | Seo | |
| 2008/0278225 A1 | 11/2008 | Hu et al. | |
| 2009/0091955 A1 | 4/2009 | Choi et al. | |
| 2009/0121697 A1 | 5/2009 | Aiura et al. | |
| 2010/0195355 A1 | 8/2010 | Zheng | |
| 2010/0296318 A1 | 11/2010 | Teo | |
| 2011/0044076 A1 | 2/2011 | Zhang et al. | |
| 2012/0195076 A1 | 8/2012 | Zhang et al. | |
| 2012/0300508 A1 | 11/2012 | Fang et al. | |
| 2013/0003421 A1 | 1/2013 | Fang | |
| 2013/0033905 A1 | 2/2013 | Lin et al. | |
| 2013/0182476 A1 | 7/2013 | Yang et al. | |
| 2013/0194845 A1* | 8/2013 | Bianco | H02M 1/4225 363/90 |
| 2014/0078790 A1* | 3/2014 | Lin | H02M 3/33507 363/21.16 |
| 2014/0218978 A1* | 8/2014 | Heuken | H05B 33/0818 363/21.16 |
| 2015/0055378 A1 | 2/2015 | Lin et al. | |
| 2015/0062981 A1 | 3/2015 | Fang et al. | |

FOREIGN PATENT DOCUMENTS

| | | |
|---|---|---|
| CN | 1988347 A | 6/2007 |
| CN | 101034851 A | 9/2007 |
| CN | 101039077 A | 9/2007 |
| CN | 101826796 A | 9/2010 |
| CN | 101841242 A | 9/2010 |
| CN | 102185484 A | 9/2011 |
| CN | 101515756 B | 11/2011 |
| CN | 102790531 A | 11/2012 |
| TW | 201234754 | 8/2012 |
| TW | 201238224 | 9/2012 |

OTHER PUBLICATIONS

Chinese Patent Office, Office Action mailed Mar. 31, 2015, in Application No. 201310386241.X.

Taiwan Patent Office, Office Action mailed Apr. 27, 2015, in Application No. 102138576.

United States Patent and Trademark Office, Notice of Allowance mailed Jun. 8, 2015, in U.S. Appl. No. 14/019,373.

United States Patent and Trademark Office, Office Action mailed Apr. 20, 2016, in U.S. Appl. No. 14/488,176.

United States Patent and Trademark Office, Notice of Allowance mailed Oct. 13, 2016, in U.S. Appl. No. 14/488,176.

Chinese Patent Office, Office Action mailed Apr. 18, 2017, in Application No. 201510541074.0.

\* cited by examiner

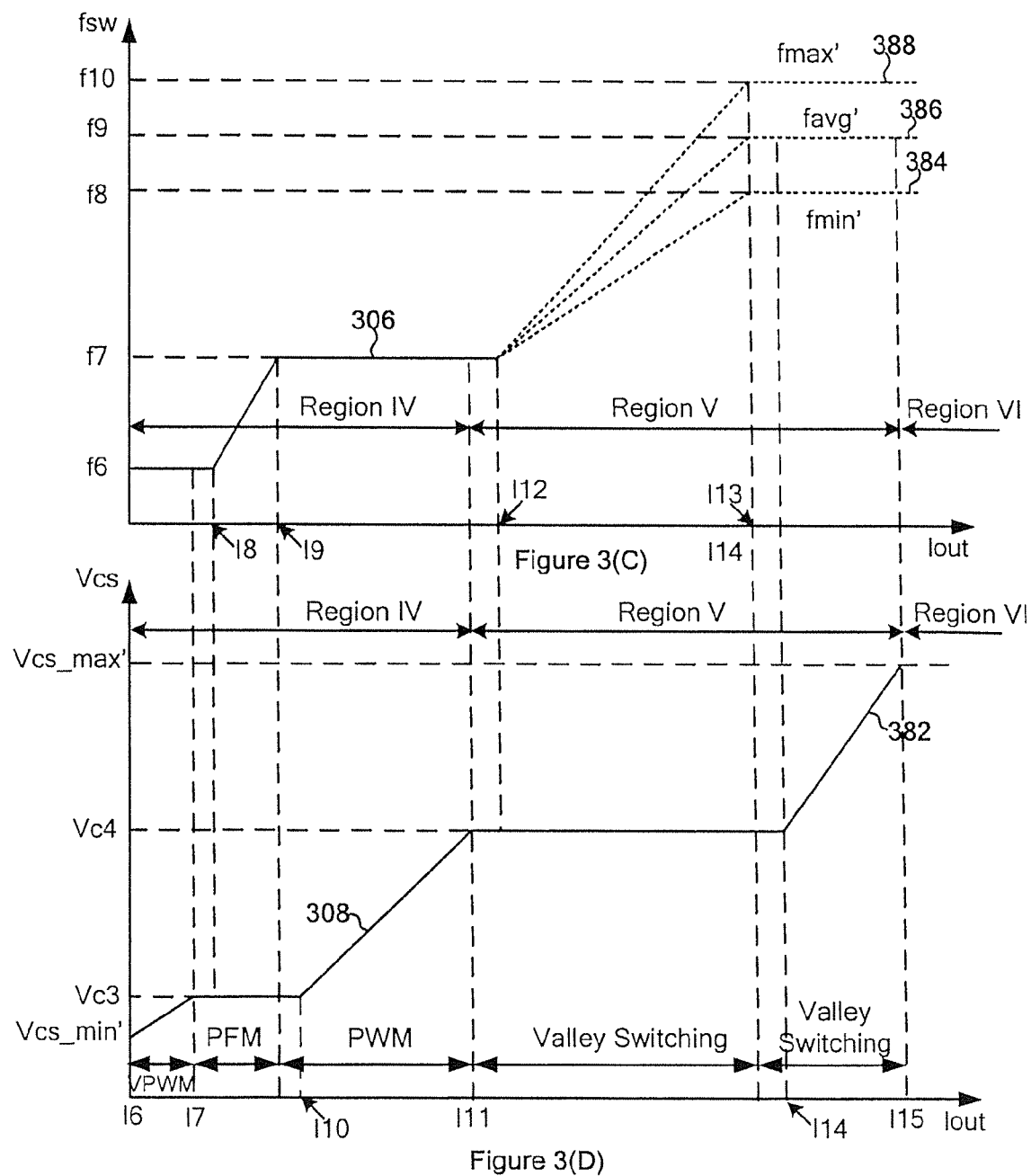

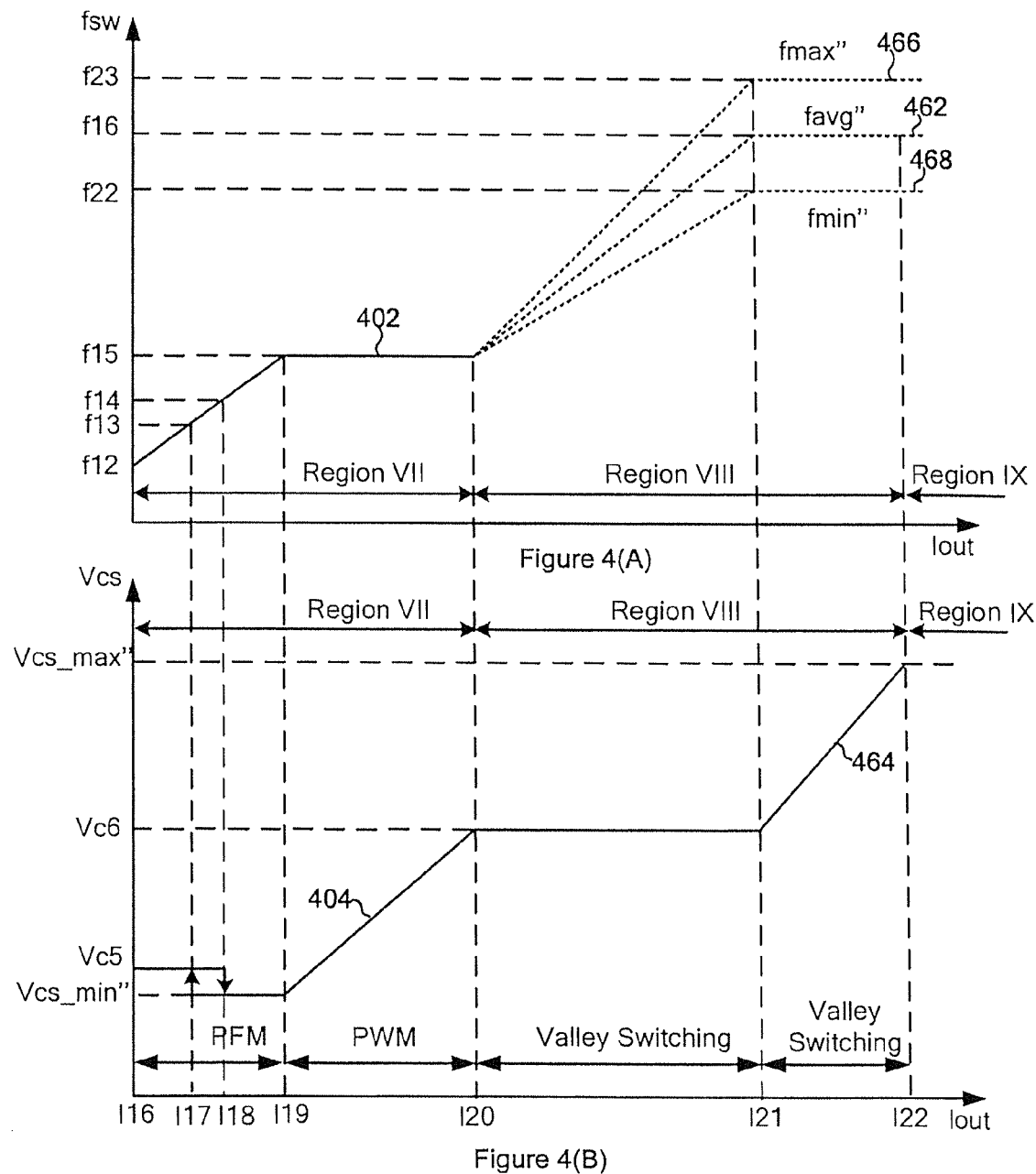

SYSTEMS AND METHODS FOR ADJUSTING FREQUENCIES AND CURRENTS BASED ON LOAD CONDITIONS OF POWER CONVERSION SYSTEMS

1. CROSS-REFERENCES TO RELATED APPLICATIONS

This application is a continuation of U.S. patent application Ser. No. 14/019,373, filed Sep. 5, 2013, which claims priority to Chinese Patent Application No. 201310386241.X, filed Aug. 29, 2013, both applications being commonly assigned and incorporated by reference herein for all purposes.

2. BACKGROUND OF THE INVENTION

The present invention is directed to integrated circuits. More particularly, the invention provides a system and method for adjusting frequencies and currents based on load conditions. Merely by way of example, the invention has been applied to power conversion systems. But it would be recognized that the invention has a much broader range of applicability.

Generally, a conventional power conversion system often uses a transformer to isolate the input voltage on the primary side and the output voltage on the secondary side. To regulate the output voltage, certain components, such as TL431 and an opto-coupler, can be used to transmit a feedback signal from the secondary side to a controller chip on the primary side. Alternatively, the output voltage on the secondary side can be imaged to the primary side, so the output voltage is controlled by directly adjusting some parameters on the primary side.

FIG. 1(A) is a simplified diagram showing a conventional flyback power conversion system with primary-side sensing and regulation. The power conversion system 100 includes a controller 102, a primary winding 110, a secondary winding 112, an auxiliary winding 114, a power switch 120, a current sensing resistor 130, an equivalent resistor 140 for an output cable, resistors 150 and 152, and a rectifying diode 160. For example, the power switch 120 is a bipolar transistor. In another example, the power switch 120 is a MOS transistor.

To regulate the output voltage within a predetermined range, information related to the output voltage and the output loading often needs to be extracted. In the power conversion system 100, such information can be extracted through the auxiliary winding 114. When the power switch 120 is turned on, the energy is stored in the secondary winding 112. Then, when the power switch 120 is turned off, the stored energy is released to the output terminal, and the voltage of the auxiliary winding 114 maps the output voltage on the secondary side as shown below.

$$V_{FB} = \frac{R_2}{R_1 + R_2} \times V_{aux} = k \times n \times (V_o + V_F + I_o \times R_{eq}) \quad \text{(Equation 1)}$$

where $V_{FB}$ represents a voltage at a node 154, and $V_{aux}$ represents the voltage of the auxiliary winding 114. $R_1$ and $R_2$ represent the resistance values of the resistors 150 and 152 respectively. Additionally, n represents a turns ratio between the auxiliary winding 114 and the secondary winding 112. Specifically, n is equal to the number of turns of the auxiliary winding 114 divided by the number of turns of the secondary winding 112. $V_o$ and $I_o$ represent an output voltage 170 and an output current 172 respectively. Moreover, $V_F$ represents the forward voltage of the rectifying diode 160, and $R_{eq}$ represents the resistance value of the equivalent resistor 140. Also, k represents a feedback coefficient as shown below:

$$k = \frac{R_2}{R_1 + R_2} \quad \text{(Equation 2)}$$

FIG. 1(B) is a simplified diagram showing a conventional operation mechanism for the flyback power conversion system 100. As shown in FIG. 1(B), the controller 102 of the conversion system 100 uses a sample-and-hold mechanism. When the demagnetization process on the secondary side is almost completed and the current $I_{sec}$ of the secondary winding 112 almost becomes zero, the voltage $V_{aux}$ of the auxiliary winding 112 is sampled at, for example, point A of FIG. 1(B). The sampled voltage value is usually held until the next voltage sampling is performed. Through a negative feedback loop, the sampled voltage value can become equal to a reference voltage $V_{ref}$. Therefore, $$V_{FB} = V_{ref} \quad \text{(Equation 3)}$$

Combining Equations 1 and 3, the following can be obtained:

$$V_o = \frac{V_{ref}}{k \times n} - V_F - I_o \times R_{eq} \quad \text{(Equation 4)}$$

Based on Equation 4, the output voltage decreases with the increasing output current.

But the power conversion system 100 often has some problems in operation, for example, audio noises under light load conditions. Hence it is highly desirable to improve the techniques of primary-side sensing and regulation.

3. BRIEF SUMMARY OF THE INVENTION

The present invention is directed to integrated circuits. More particularly, the invention provides a system and method for adjusting frequencies and currents based on load conditions. Merely by way of example, the invention has been applied to power conversion systems. But it would be recognized that the invention has a much broader range of applicability.

According to one embodiment, a system controller for regulating a power conversion system includes a driving component and a detection component. The driving component is configured to output a driving signal to a switch associated with a first current flowing through a primary winding of a power conversion system, the switch including a first switch terminal related to a first voltage and a second switch terminal related to a second voltage, the driving signal being associated with a plurality of switching periods including a first switching period and a second switching period. The detection component is configured to receive an input signal associated with a difference between the first voltage and the second voltage, detect at least one valley of the input signal in magnitude during a detection period for the first switching period, and output a detection signal based on at least information associated with the input signal to affect the driving signal. The driving component is further configured to, in response to the detection component detecting the valley of the input signal during the detection period for the first switching period, change the driving signal during the detection period to end the first switching period and start the second switching period, the second switching period following the first switching period. The detection period begins at the end of a first predetermined time period and ends at the end of a second predetermined time period, the second predetermined time period being larger in duration than the first predetermined time period.

According to another embodiment, a system controller for regulating a power conversion system includes a current-control component and a driving component. The current-control component is configured to receive a current-sensing signal associated with a first current flowing through a primary winding of a power conversion system and a first signal associated with an output current of the power conversion system and output one or more second signals based on at least information associated with the current-sensing signal and the first signal. The driving component is configured to generate a driving signal based on at least information associated with the one or more second signals and output the driving signal to a switch to affect the first current, the driving signal being related to one or more switching periods. The current-control component and the driving component are further configured to, in response to the first signal indicating the output current increases in magnitude, change the driving signal to affect the first current in order to decrease one or more peak magnitudes of the current-sensing signal corresponding to the one or more switching periods respectively. In addition, the current-control component and the driving component are configured to, in response to the first signal indicating the output current decreases in magnitude, change the driving signal to affect the first current in order to increase the one or more peak magnitudes of the current-sensing signal corresponding to the one or more switching periods respectively.

According to yet another embodiment, a system controller for regulating a power conversion system includes a driving component and a detection component. The driving component is configured to output a driving signal to a switch associated with a first current flowing through a primary winding of a power conversion system, the switch including a first switch terminal related to a first voltage and a second switch terminal related to a second voltage, the driving signal being associated with a plurality of switching periods including a first switching period and a second switching period, the first switching period including an on-time period and a demagnetization period following the on-time period. The detection component is configured to receive an input signal associated with a difference between the first voltage and the second voltage, process information associated with the input signal, and output a detection signal based on at least information associated with the input signal to affect the driving signal. The driving component is further configured to, in response to the detection component detecting a valley of the input signal during a detection period for the first switching period, change the driving signal during the detection period to end the first switching period and start the second switching period, the second switching period following the first switching period. The driving component is further configured to, in response to the detection component not detecting the valley of the input signal during the detection period for the first switching period, change the driving signal at the end of the detection period to end the first switching period and start the second switching period. The driving component is further configured to, in response to the detection period ending before the demagnetization period ends, change the driving signal at the end of the demagnetization period to end the first switching period and start the second switching period.

In one embodiment, a method for regulating a power conversion system includes, outputting a driving signal to a switch associated with a first current flowing through a primary winding of a power conversion system, the switch including a first switch terminal related to a first voltage and a second switch terminal related to a second voltage, the driving signal being associated with a plurality of switching periods including a first switching period and a second switching period, receiving an input signal associated with a difference between the first voltage and the second voltage, and processing information associated with the input signal. The method further includes, detecting at least one valley of the input signal in magnitude during a detection period for the first switching period, and outputting a detection signal based on at least information associated with the input signal to affect the driving signal. The outputting a driving signal to a switch associated with a first current flowing through a primary winding of a power conversion system includes, in response to detecting the valley of the input signal during the detection period for the first switching period, changing the driving signal during the detection period to end the first switching period and start the second switching period, the second switching period following the first switching period. The detection period begins at the end of a first predetermined time period and ends at the end of a second predetermined time period, the second predetermined time period being larger in duration than the first predetermined time period.

In another embodiment, a method for regulating a power conversion system includes, receiving a current-sensing signal associated with a first current flowing through a primary winding of a power conversion system and a first signal associated with an output current of the power conversion system, processing information associated with the current-sensing signal, and outputting one or more second signals based on at least information associated with the current-sensing signal and the first signal. The method includes, generating a driving signal based on at least information associated with the one or more second signals, and outputting the driving signal to a switch to affect the first current, the driving signal being related to one or more switching periods. The outputting the driving signal to a switch to affect the first current includes, in response to the first signal indicating the output current increases in magnitude, changing the driving signal to affect the first current in order to decrease one or more peak magnitudes of the current-sensing signal corresponding to the one or more switching periods respectively, and in response to the first signal indicating the output current decreases in magnitude, changing the driving signal to affect the first current in order to increase the one or more peak magnitudes of the current-sensing signal corresponding to the one or more switching periods respectively.

In yet another embodiment, a method for regulating a power conversion system includes, outputting a driving signal to a switch associated with a first current flowing through a primary winding of a power conversion system, the switch including a first switch terminal related to a first voltage and a second switch terminal related to a second voltage, the driving signal being associated with a plurality of switching periods including a first switching period and a second switching period, the first switching period including an on-time period and a demagnetization period following the on-time period, receiving an input signal associated with a difference between the first voltage and the second voltage, processing information associated with the input signal, and outputting a detection signal based on at least information associated with the input signal to affect the driving signal. The outputting a driving signal to a switch associated with a first current flowing through a primary winding of a power conversion system includes, in response to detecting a valley of the input signal during a detection period for the first switching period, changing the driving signal during the detection period to end the first switching period and start the second switching period, the second switching period following the first switching period, in response to not detecting the valley of the input signal during the detection period for the first switching period, changing the driving signal at the end of the detection period to end the first switching period and start the second switching period, and in response to the detection period endings before the demagnetization period ends, changing the driving signal at the end of the demagnetization period to end the first switching period and start the second switching period.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 1A:
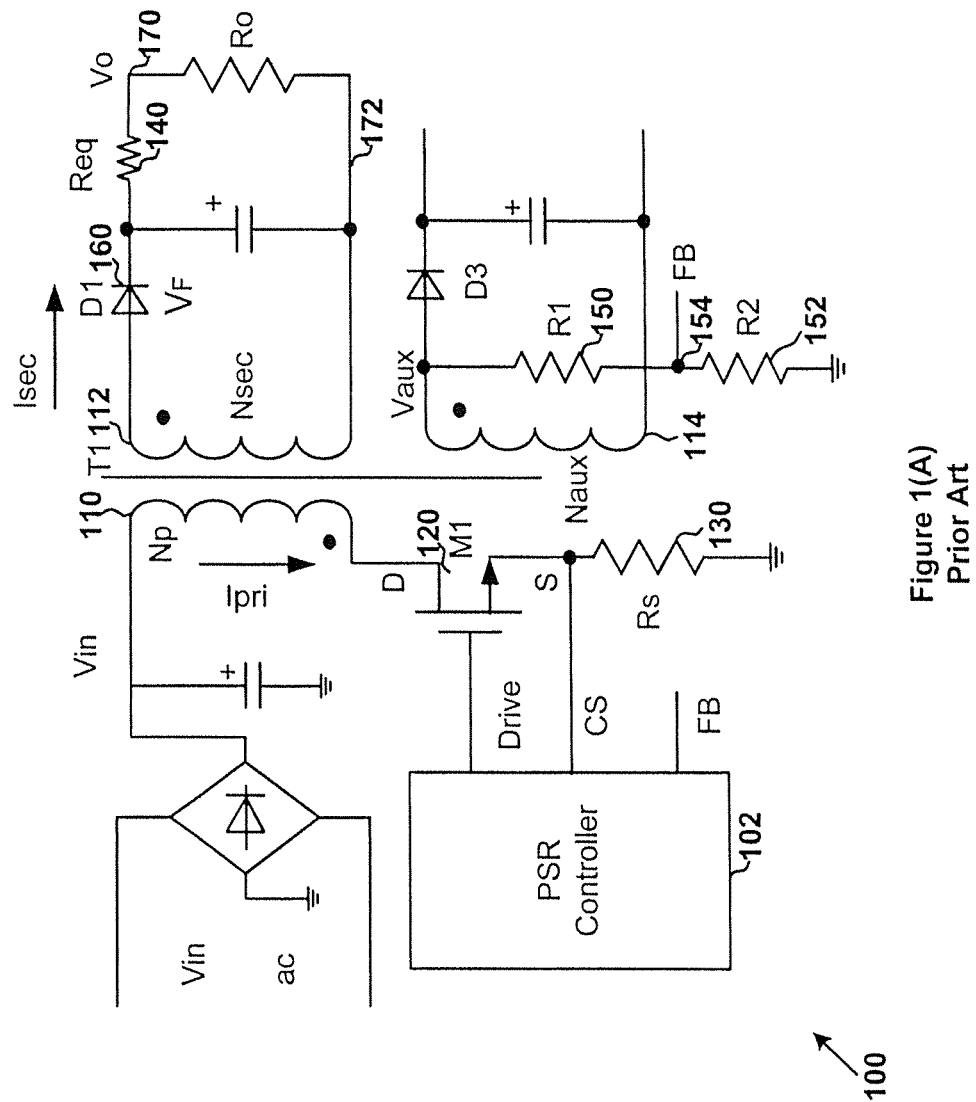
FIG. 1(A) is a simplified diagram showing a conventional flyback power conversion system with primary-side sensing and regulation.
Figure 1B:
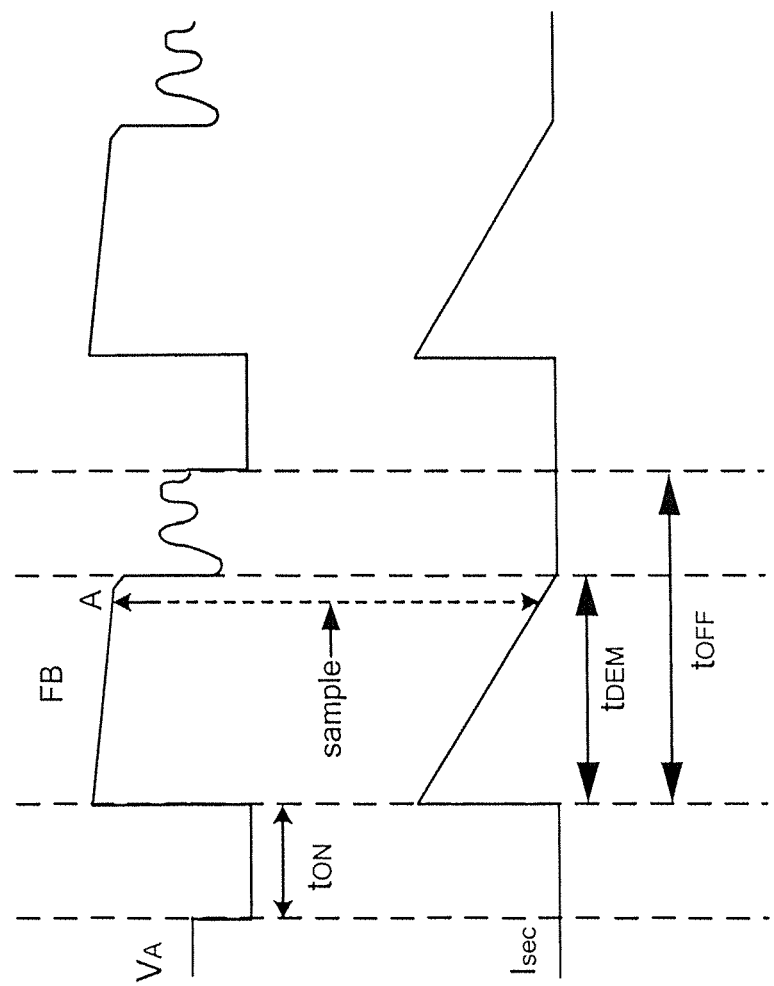
FIG. 1(B) is a simplified diagram showing a conventional operation mechanism for the flyback power conversion system as shown in FIG. 1(A).
Figure 2:
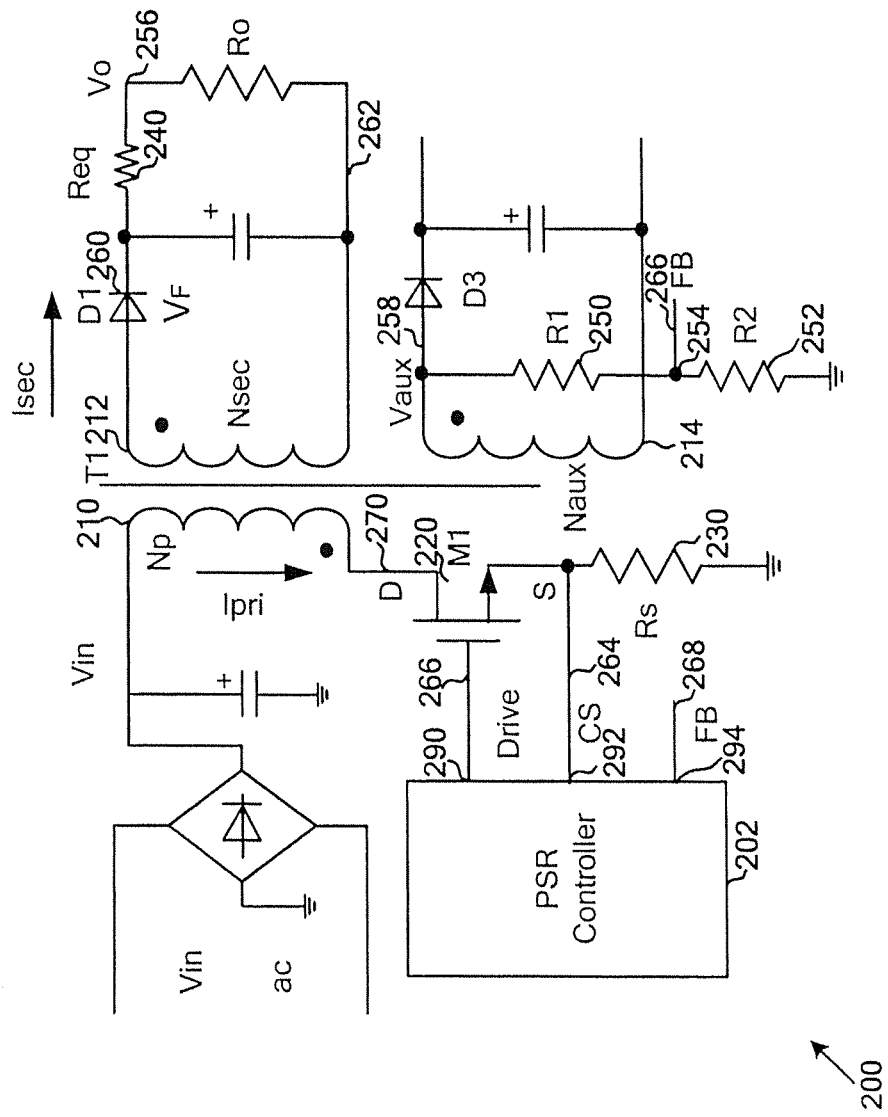
FIG. 2 is a simplified diagram showing a power conversion system according to an embodiment of the present invention.

FIG. 3(C) is a simplified diagram showing a relationship between a switching frequency and an output current of the power conversion system as shown in FIG. 2 and FIG. 3(D) is a simplified diagram showing a relationship between peak magnitudes of a current sensing signal and an output current of the power conversion system as shown in FIG. 2 according to certain embodiments of the present invention.

FIG. 4(A) is a simplified diagram showing a relationship between a switching frequency and an output current of the power conversion system as shown in FIG. 2 and FIG. 4(B) is a simplified diagram showing a relationship between peak magnitudes of a current sensing signal and an output current of the power conversion system as shown in FIG. 2 according to some embodiments of the present invention.

Figures 4C, 4D:
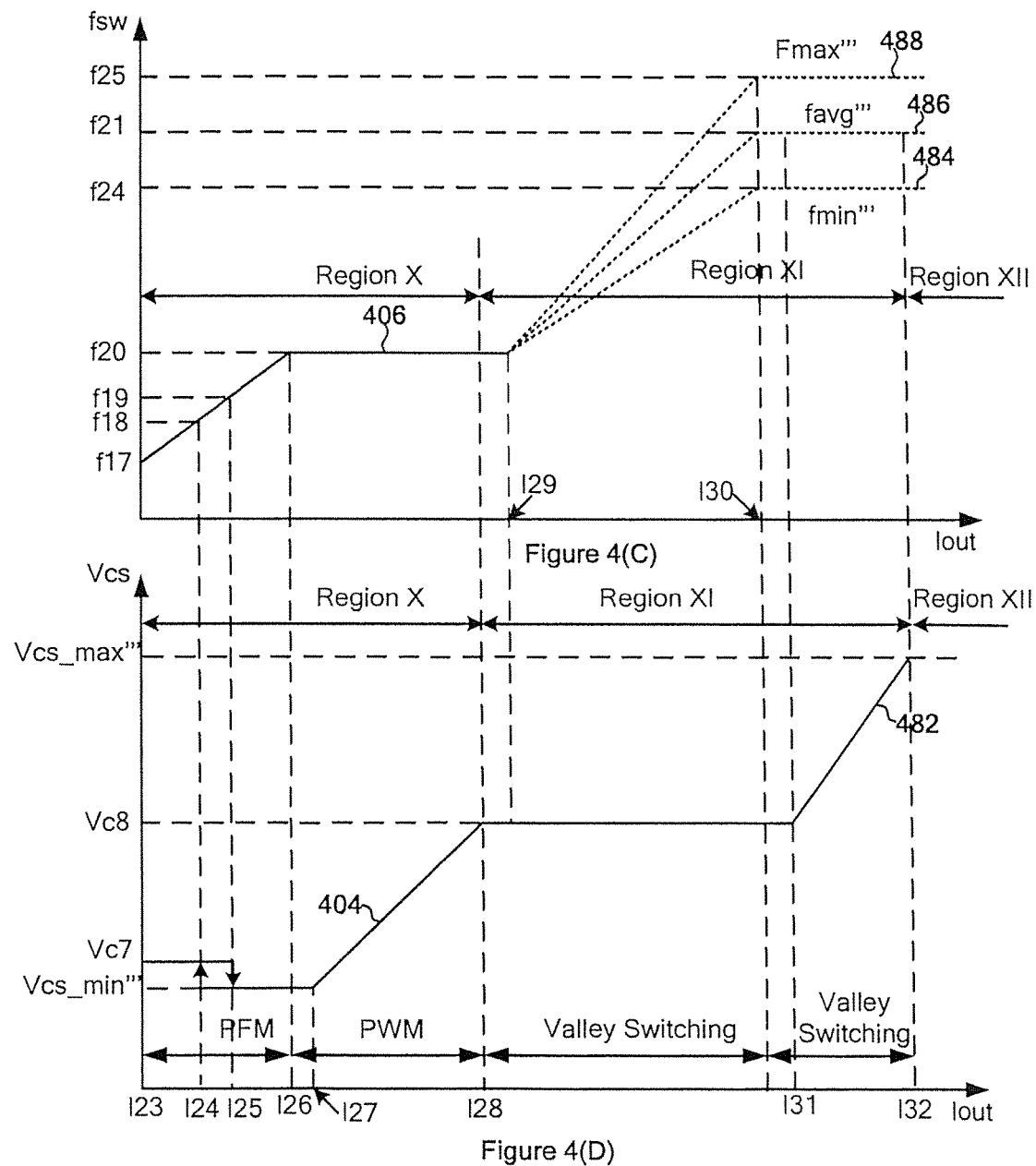

FIG. 4(C) is a simplified diagram showing a relationship between a switching frequency and an output current of the power conversion system as shown in FIG. 2 and FIG. 4(D) is a simplified diagram showing a relationship between peak magnitudes of a current sensing signal and an output current of the power conversion system as shown in FIG. 2 according to certain embodiments of the present invention.

Figure 5:
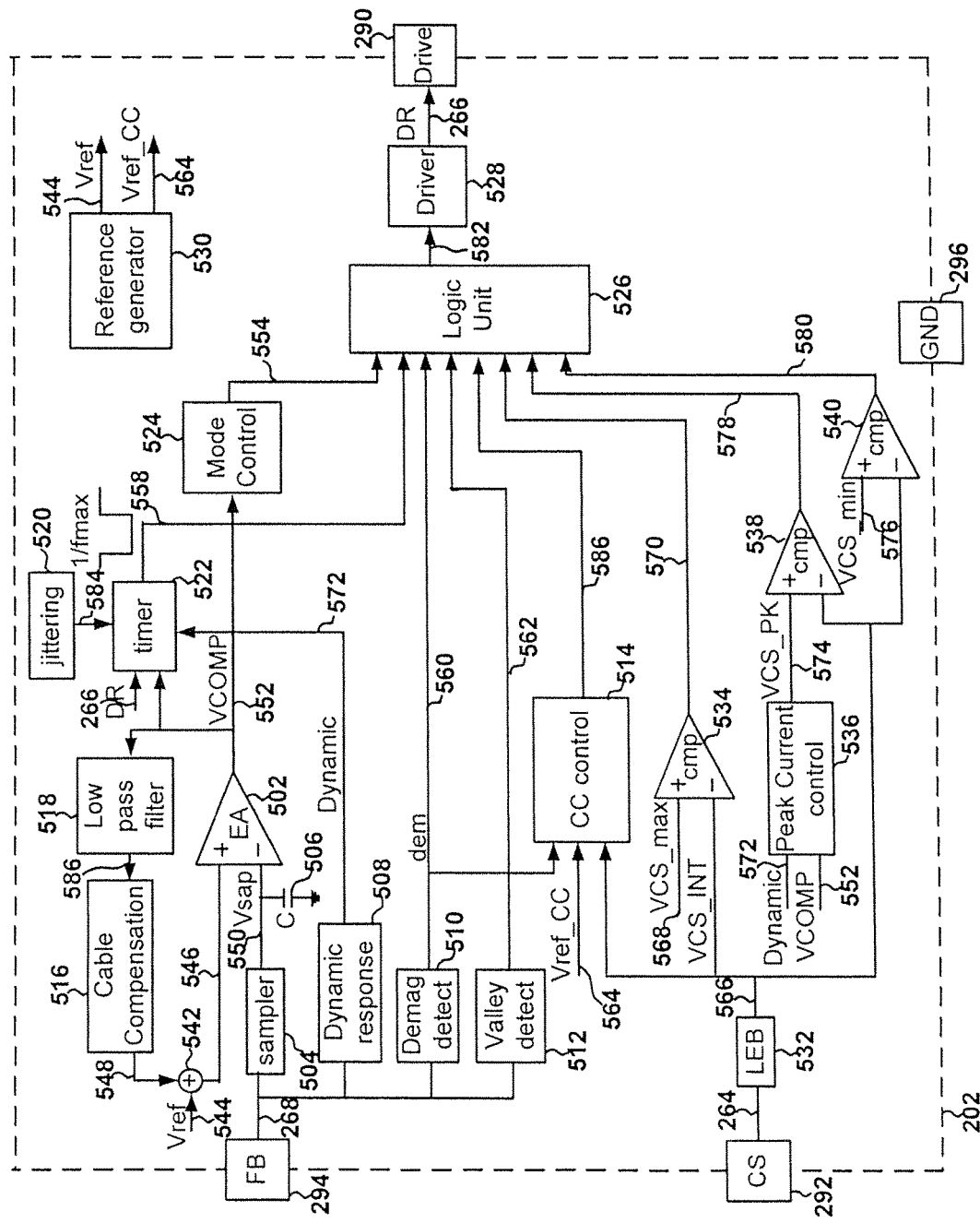

FIG. 5 is a simplified diagram showing the controller as part of the power conversion system as shown in FIG. 2 according to an embodiment of the present invention.

Figures 6A, 6B:
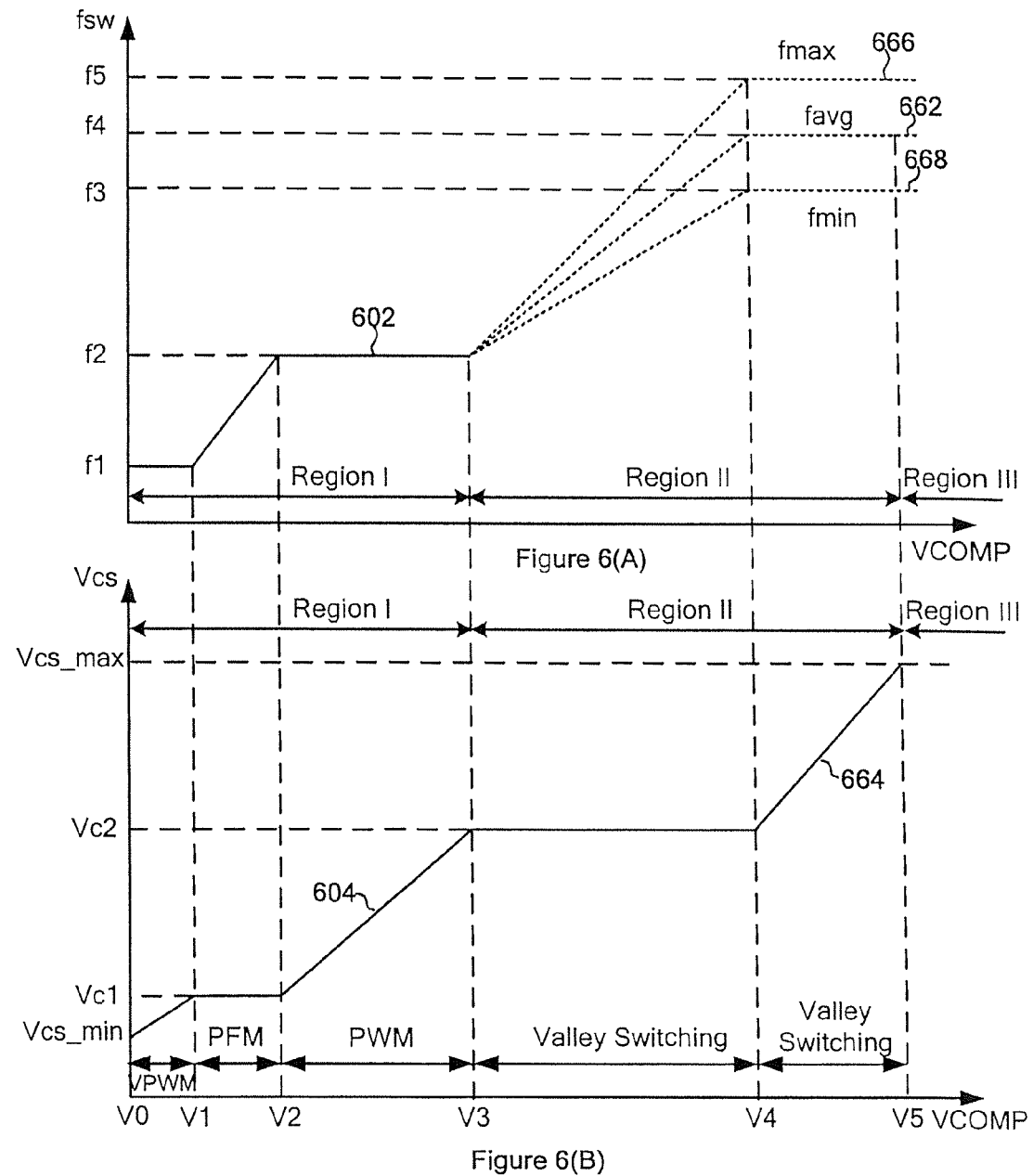

FIG. 6(A) is a simplified diagram showing a relationship between a switching frequency and an amplified signal as shown in FIG. 5 and FIG. 6(B) is a simplified diagram showing a relationship between peak magnitudes of a current sensing signal and the amplified signal as shown in FIG. 5 according to some embodiments of the present invention.

Figures 6C, 6D:
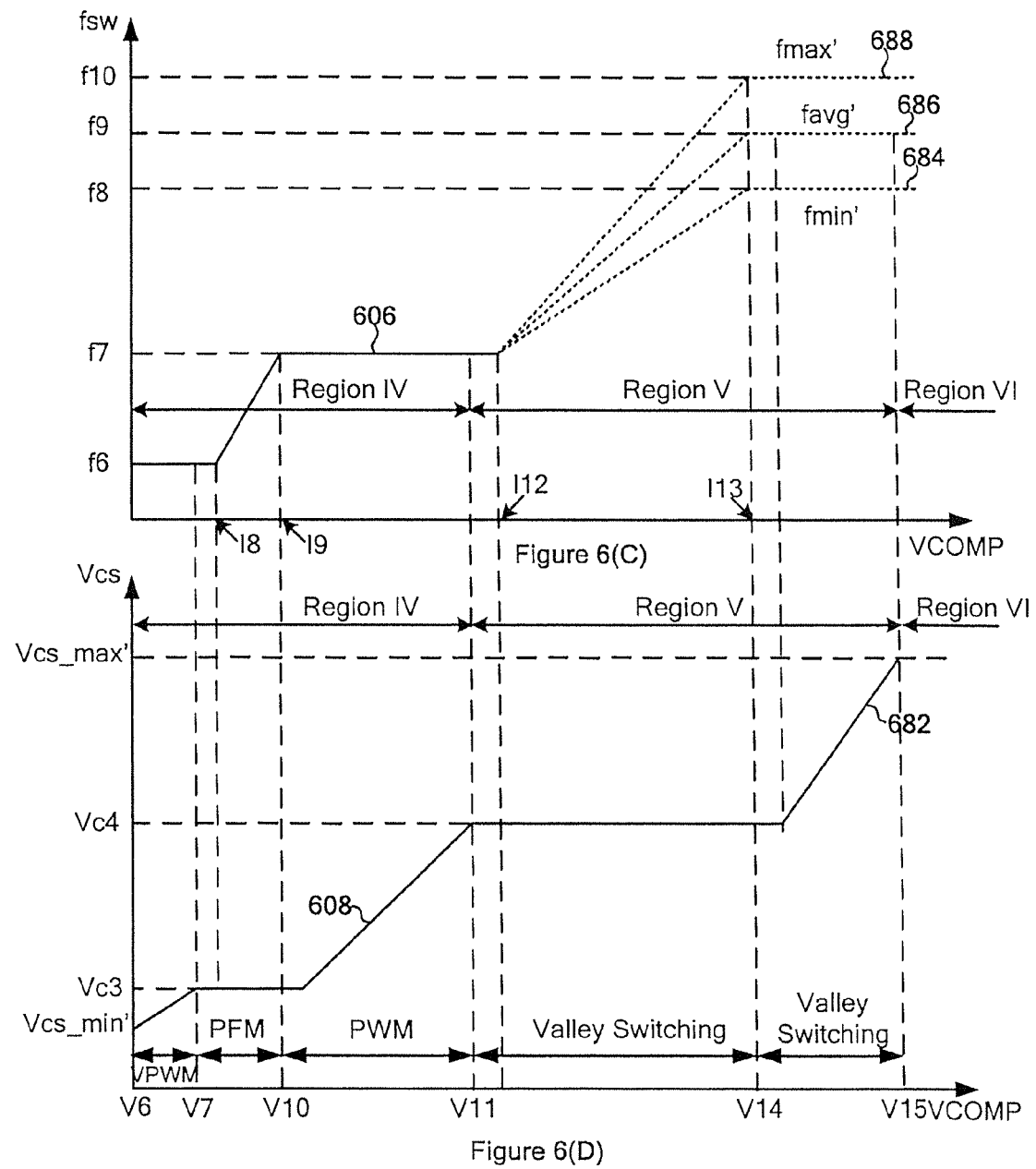

FIG. 6(C) is a simplified diagram showing a relationship between a switching frequency and an amplified signal as shown in FIG. 5 and FIG. 6(D) is a simplified diagram showing a relationship between peak magnitudes of a current sensing signal and the amplified signal as shown in FIG. 5 according to certain embodiments of the present invention.

Figures 7A, 7B:
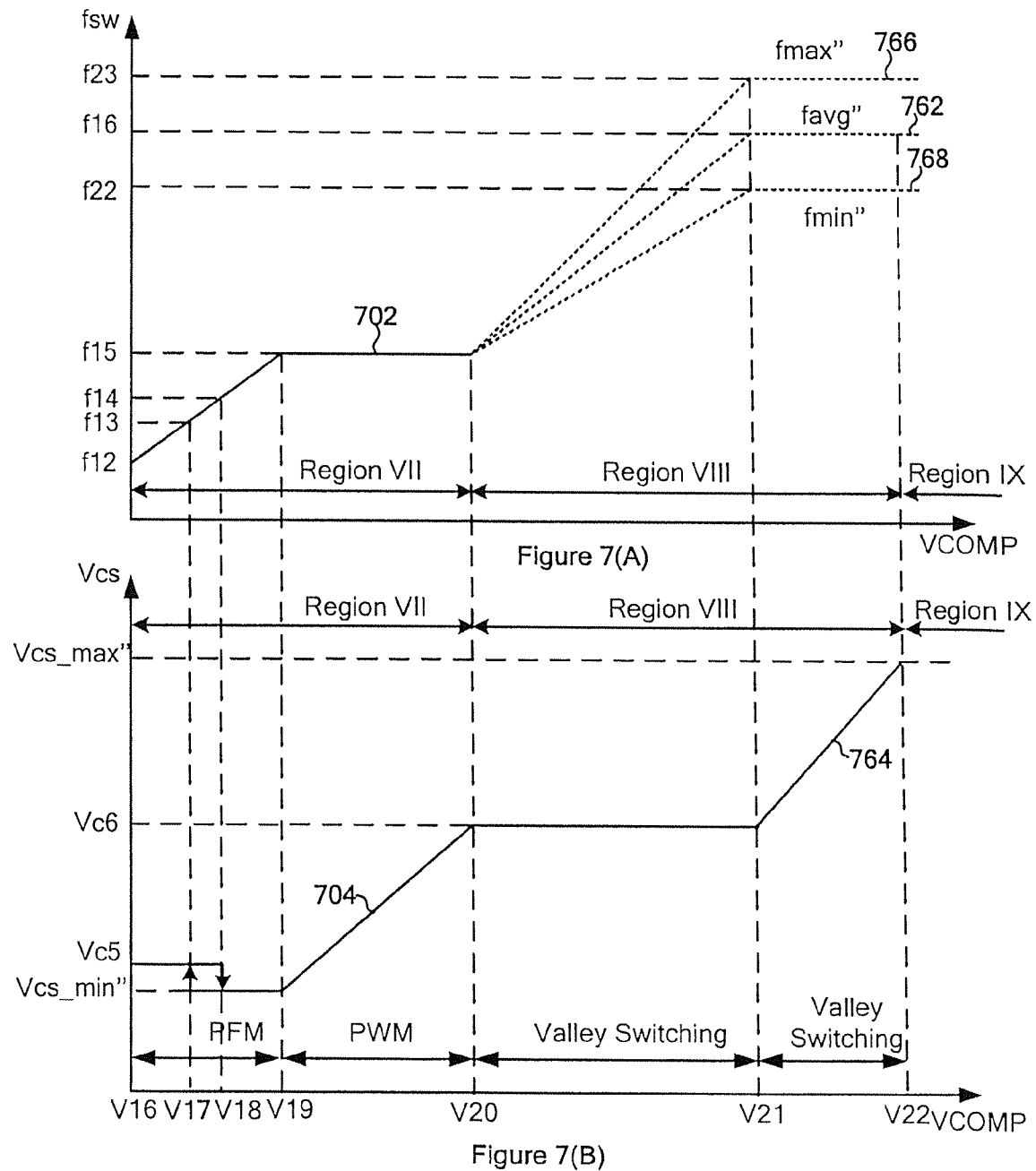

FIG. 7(A) is a simplified diagram showing a relationship between a switching frequency and an amplified signal as shown in FIG. 5 and FIG. 7(B) is a simplified diagram showing a relationship between peak magnitudes of a current sensing signal and the amplified signal as shown in FIG. 5 according to some embodiments of the present invention.

Figures 7C, 7D:
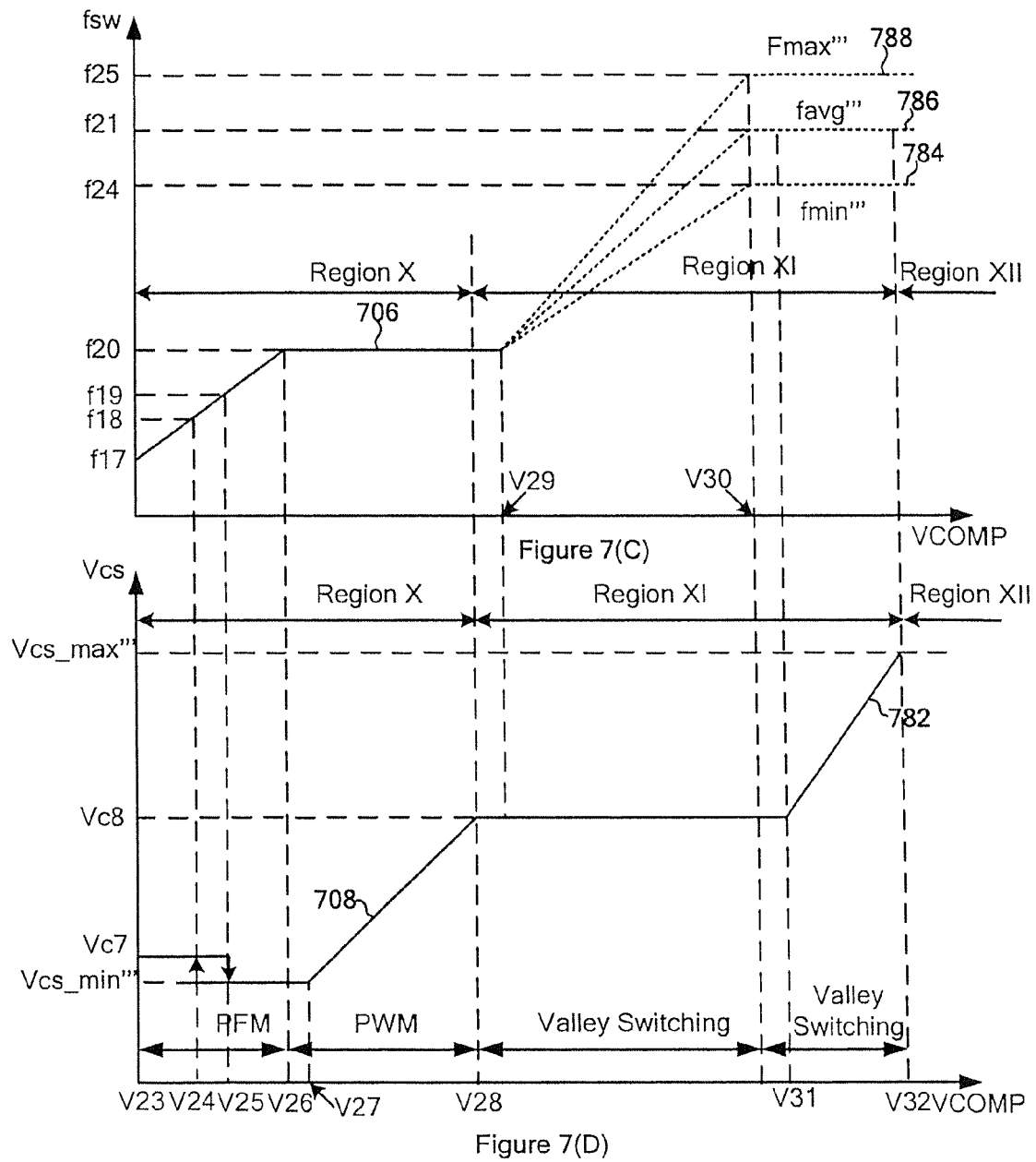

FIG. 7(C) is a simplified diagram showing a relationship between a switching frequency and an amplified signal as shown in FIG. 5 and FIG. 7(D) is a simplified diagram showing a relationship between peak magnitudes of a current sensing signal and the amplified signal as shown in FIG. 5 according to certain embodiments of the present invention.

Figure 8A:
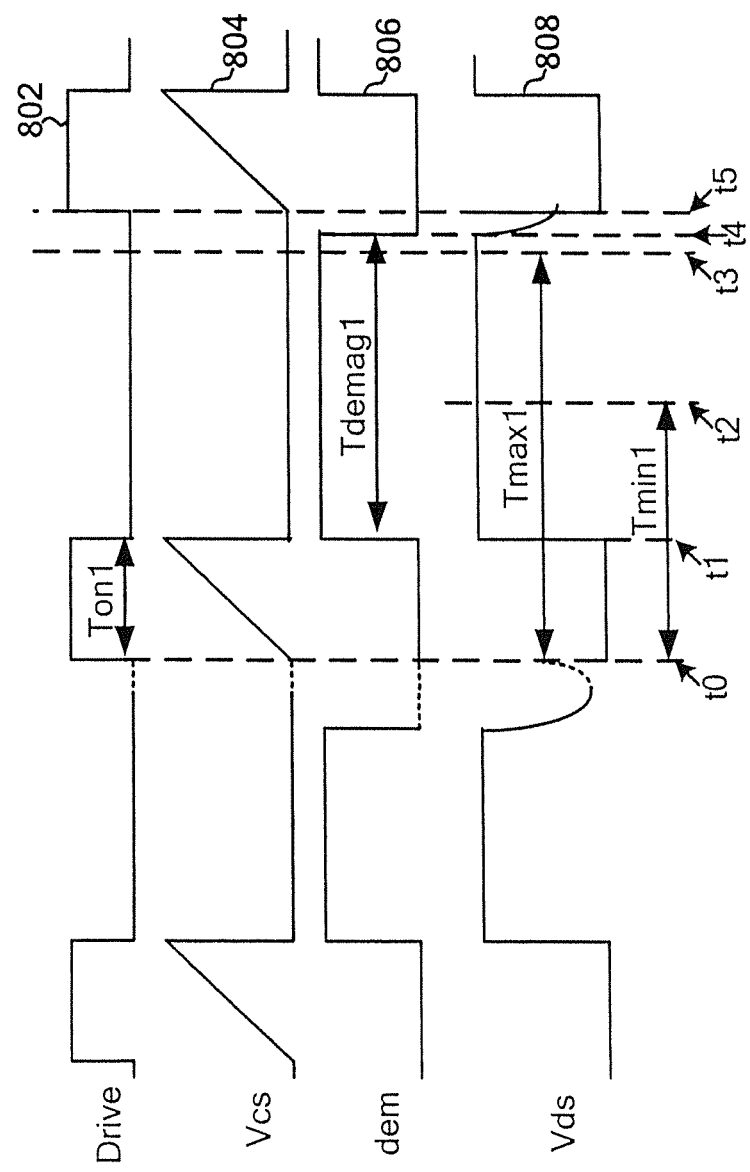

FIG. 8(A) shows a timing diagram under heavy load conditions for the power conversion system as shown in FIG. 2 according to an embodiment of the present invention.

Figure 8B:
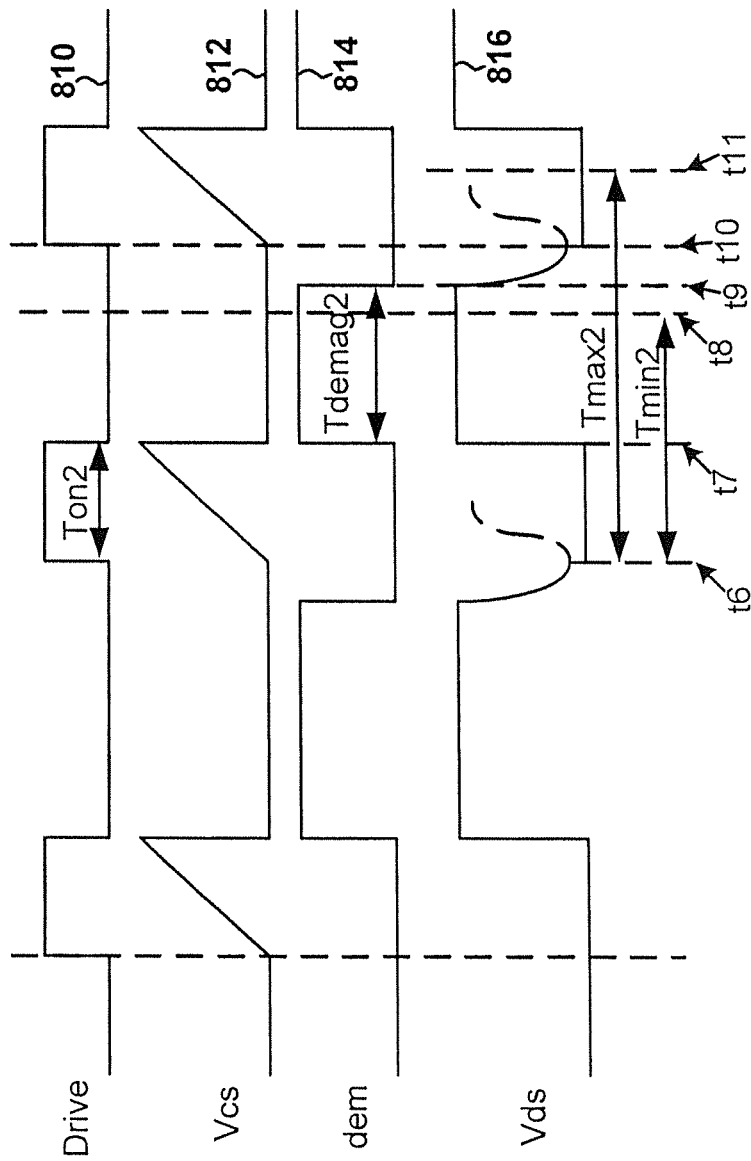

FIG. 8(B) shows a timing diagram for the power conversion system as shown in FIG. 2 operating in a valley switching mode, according to another embodiment of the present invention.

Figure 8C:
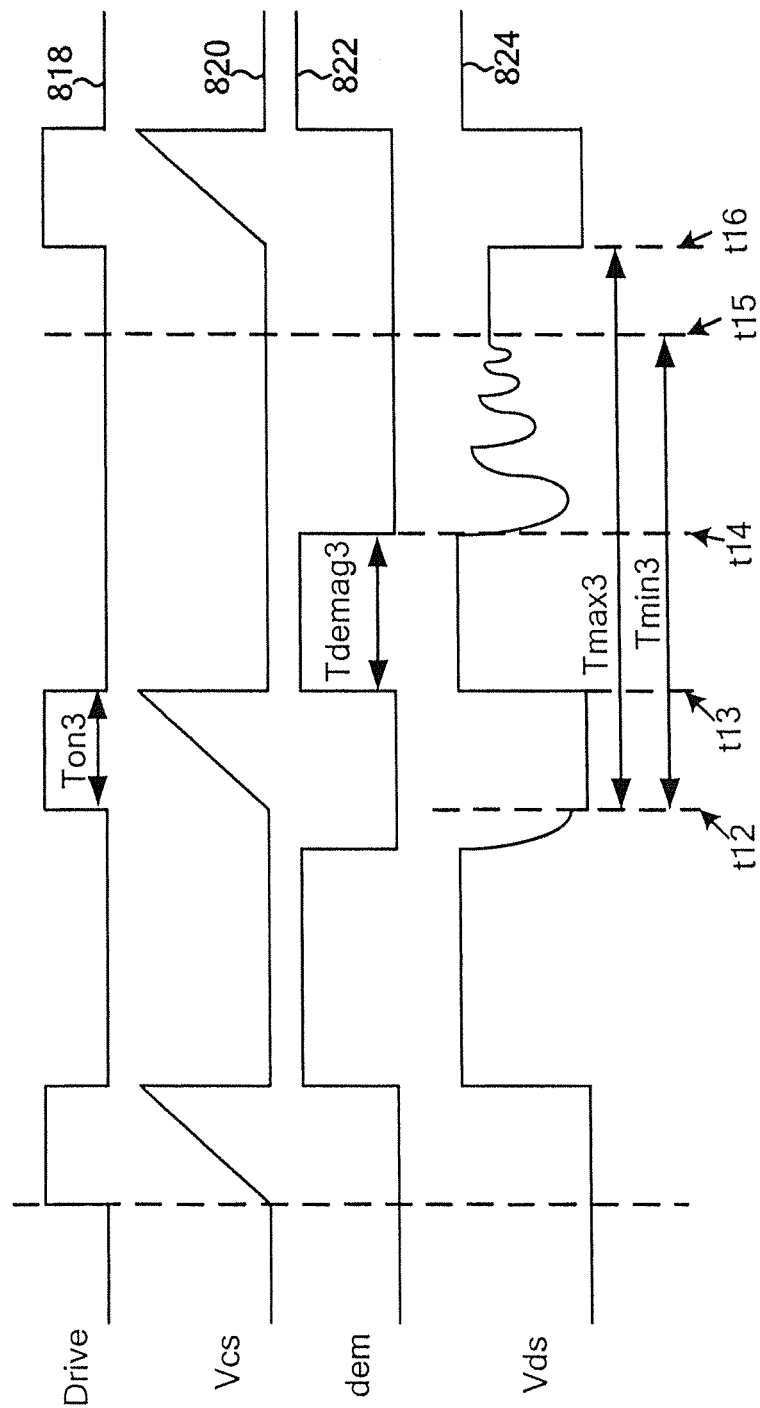

FIG. 8(C) shows a timing diagram under light load conditions for the power conversion system as shown in FIG. 2, according to yet another embodiment of the present invention.

Figure 9:
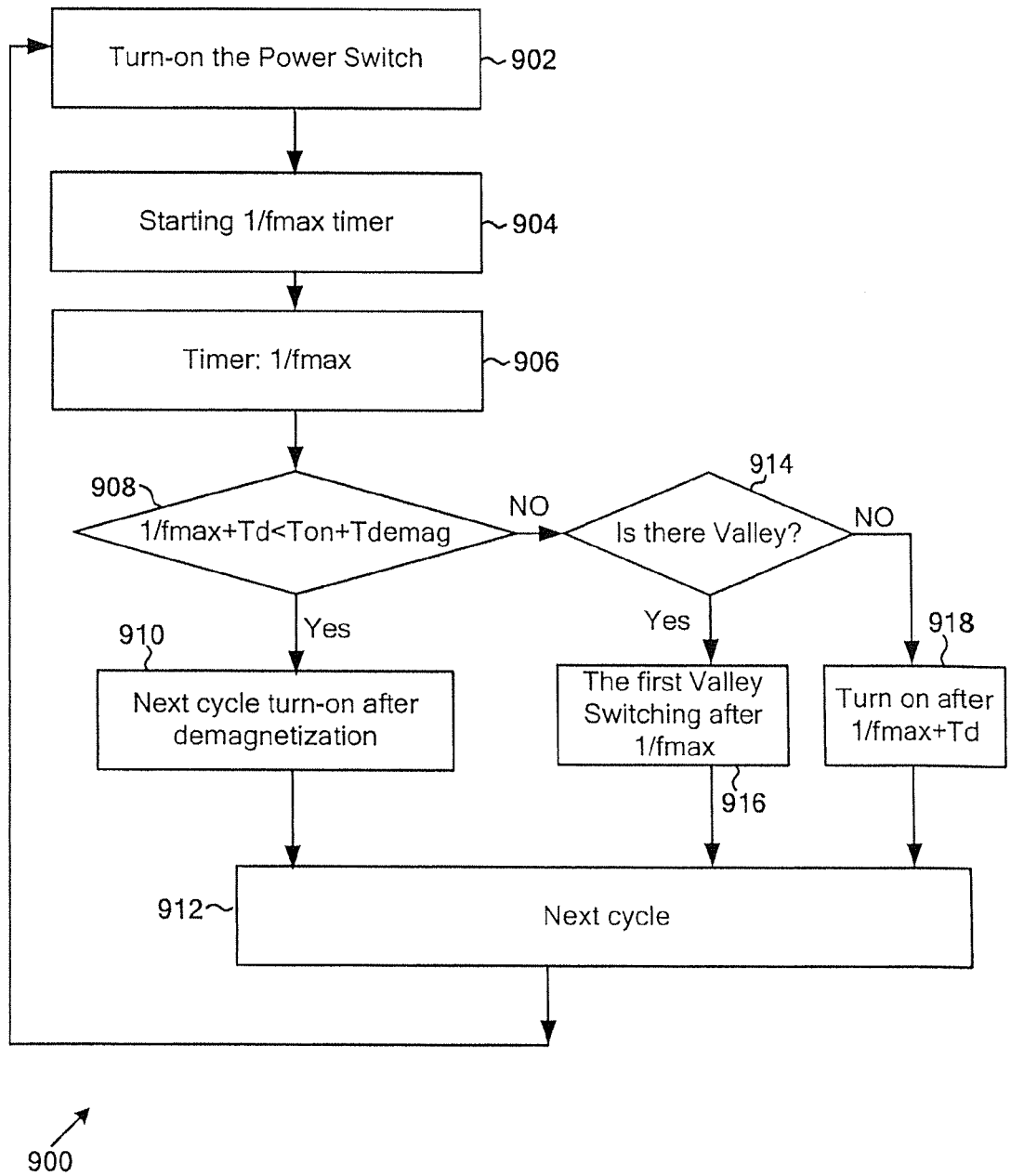

FIG. 9 is a simplified diagram showing a method for operations of the power conversion system as shown in FIG. 2 according to one embodiment of the present invention.

5. DETAILED DESCRIPTION OF THE INVENTION

The present invention is directed to integrated circuits. More particularly, the invention provides a system and method for adjusting frequencies and currents based on load conditions. Merely by way of example, the invention has been applied to power conversion systems. But it would be recognized that the invention has a much broader range of applicability.

FIG. 2 is a simplified diagram showing a power conversion system according to an embodiment of the present invention. This diagram is merely an example, which should not unduly limit the scope of the claims. One of ordinary skill in the art would recognize many variations, alternatives, and modifications. The power conversion system 200 includes a controller 202, a primary winding 210, a secondary winding 212, an auxiliary winding 214, a power switch 220, a current sensing resistor 230, an equivalent resistor 240 for an output cable, resistors 250 and 252, and a rectifying diode 260. In addition, the controller 202 includes terminals 290, 292 and 294. For example, the power switch 220 is a bipolar transistor. In another example, the power switch 220 is a MOS transistor.

According to one embodiment, when the power switch 220 is closed (e.g., being turned on), the energy is stored in the secondary winding 212. For example, when the power switch 220 is open (e.g., being turned off), the stored energy is released to the output terminal. In another example, a voltage 258 of the auxiliary winding 214 maps an output voltage 256 on the secondary side as shown below.

$$V_{FB} = \frac{R_2}{R_1 + R_2} \times V_{aux} = k \times n \times (V_o + V_F + I_o \times R_{eq}) \quad \text{(Equation 5)}$$

where $V_{FB}$ represents a signal 268 at a node 254, and $V_{aux}$ represents the voltage 258 of the auxiliary winding 214. $R_1$ and $R_2$ represent the resistance values of the resistors 250 and 252 respectively. Additionally, n represents a turns ratio between the auxiliary winding 214 and the secondary winding 212. As an example, n is equal to the number of turns of the auxiliary winding 214 divided by the number of turns of the secondary winding 212. $V_o$ and $I_o$ represent the output voltage 256 and an output current 262 respectively. Moreover, $V_F$ represents the forward voltage of the rectifying diode 260, and $R_{eq}$ represents the resistance value of the equivalent resistor 240. Also, k represents a feedback coefficient as shown below:

$$k = \frac{R_2}{R_1 + R_2} \quad \text{(Equation 6)}$$

According to another embodiment, the controller 202 outputs a driving signal 266 to the switch 220. For example, if the switch 220 is closed in response to the signal 266, a primary current 270 flows through the primary winding 210, and a current sensing signal 264 is generated through the resistor 230 representing a peak current flowing through the primary winding 210 (e.g., for each switching period). In another example, the controller 202 changes the signal 266 between a logic high level and a logic low level according to a switching frequency associated with a switching period. In yet another example, the switching period is inversely proportional to the switching frequency. In yet another example, a switching period corresponds to a switching cycle.

According to yet another embodiment, the controller 202 is configured to detect one or more valleys in the drain-source voltage of the switch 220 during a detection period for each switching cycle. For example, if the controller 202 detects a valley appearing in the drain-source voltage of the switch 220 during the detection period for a particular switching cycle, the controller 202 is further configured to change the driving signal 266 upon the detection of the valley in order to start a new switching cycle. In another example, the detection period is determined based on a minimum switching frequency and a maximum switching frequency. In yet another example, the minimum switching frequency is associated with a maximum switching period, and the maximum switching frequency is associated with a minimum switching period. In yet another example, the detection period starts at the end of the minimum switching period corresponding to the maximum switching frequency, and ends at the end of the maximum switching period corresponding to the minimum switching frequency. In yet another example, if the controller 202 does not detect a valley in the drain-source voltage of the switch 220 during the detection period for a particular switching cycle, the controller 202 is configured to change, at the end of the maximum switching period, the driving signal 266 in order to start a new switching cycle. In yet another example, the minimum switching period and the maximum switching period indicate a range for switching periods of the power conversion system 200.

According to yet another embodiment, for a particular switching cycle, the minimum switching period and an on-time period during which the switch 220 is closed (e.g., being turned on) both start at the beginning of the switching cycle, and a demagnetization period begins at the end of the on-time period. For example, if the minimum switching period ends earlier than the demagnetization period, the controller 202 is further configured to close (e.g., turn on) the switch 202 at the end of the demagnetization period in order to start a new switching cycle.

Figures 3A, 3B:
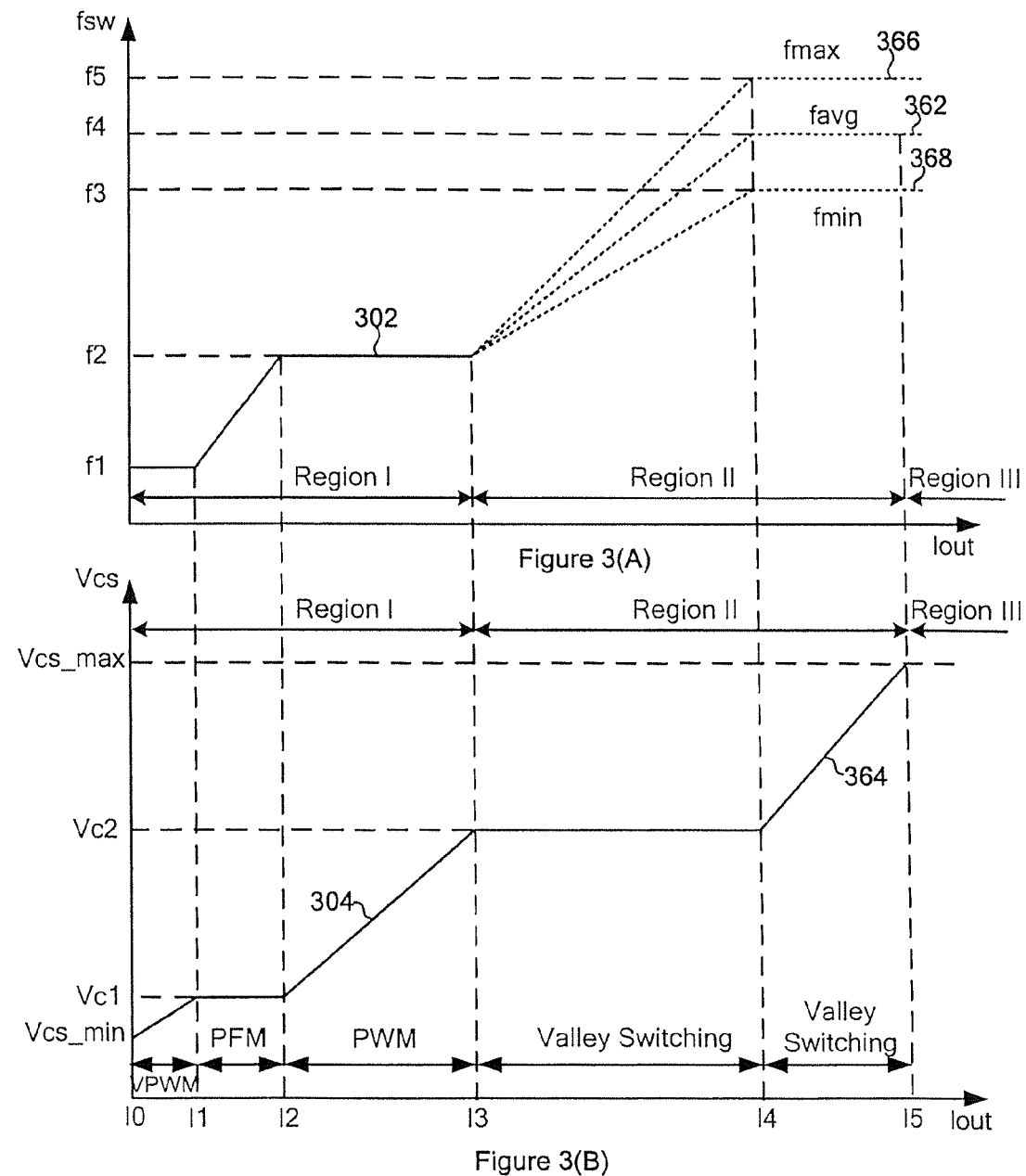
FIG. 3(A) is a simplified diagram showing a relationship between a switching frequency and an output current of the power conversion system as shown in FIG. 2
FIG. 3(B) is a simplified diagram showing a relationship between peak magnitudes of a current sensing signal and an output current of the power conversion system as shown in FIG. 2 according to some embodiments of the present invention.

FIG. 3(A) is a simplified diagram showing the relationship between the switching frequency and the output current 262 of the power conversion system 200 and FIG. 3(B) is a simplified diagram showing the relationship between peak magnitudes of the current sensing signal 264 and the output current 262 of the power conversion system 200 according to some embodiments of the present invention. These diagrams are merely examples, which should not unduly limit the scope of the claims. One of ordinary skill in the art would recognize many variations, alternatives, and modifications. As shown in FIG. 3(A) and FIG. 3(B), Region I corresponds to the output current 262 being larger than or equal to $I_0$ but smaller than $I_3$, Region II corresponds to the output current 262 being larger than or equal to $I_3$ but smaller than or equal to $I_5$, and Region III corresponds to the output current 262 being larger than $I_5$ in magnitude.

The waveform 302 represents a relationship between the switching frequency (e.g., $f_{sw}$) and the output current 262 (e.g., $I_{out}$) in Region I, and the waveform 304 represents a relationship between peak magnitudes of the current sensing signal 264 (e.g., $V_{cs}$) and the output current 262 (e.g., $I_{out}$) in Region I. The waveform 364 represents a relationship between peak magnitudes of the current sensing signal 264 (e.g., $V_{cs}$) and the output current 262 (e.g., $I_{out}$) in Region II, the waveform 366 represents a relationship between a maximum switching frequency (e.g., $f_{max}$) and the output current 262 (e.g., $I_{out}$) in Region II, and the waveform 368 represents a relationship between a minimum switching frequency (e.g., $f_{min}$) and the output current 262 (e.g., $I_{out}$) in Region II. For example, if $I_{out}=I_0$, the power conversion system 200 is under no load conditions, and if $I_{out}=I_5$, the power conversion system 200 is under full load conditions. In another example, $I_0 \leq I_1 \leq I_2 \leq I_3 \leq I_4 \leq I_5$.

As shown in FIG. 3(A), in Region I, if the output current 262 satisfies $I_0$ the power conversion system 200 operates in a voltage-mode pulse-width-modulation (VPWM) mode, and the switching frequency (e.g., $f_{sw}$) keeps approximately constant (e.g., $f_1$), according to some embodiments. For example, if the output current 262 satisfies $I_1 \leq I_{out} < I_2$, the power conversion system 200 operates in a pulse-frequency-modulation (PFM) mode, and the switching frequency (e.g., $f_{sw}$) increases (e.g., linearly, or exponentially) with the output current 262. In another example, if the output current 262 satisfies $I_2 \leq I_{out} < I_3$, the power conversion system 200 operates in a pulse-width-modulation (PWM) mode, and the switching frequency (e.g., $f_{sw}$) keeps approximately constant (e.g., $f_2$). As shown in FIG. 3(B), if $I_0 \leq I_{out} < I_1$, the peak magnitudes of the current sensing signal 264 (e.g., $V_{cs}$) changes with the output current 262 (e.g., at a slope $S_{1p}$), according to some embodiments. For example, the peak magnitudes of the current sensing signal 264 (e.g., $V_{cs}$)

change from a minimum magnitude (e.g., $V_{cs\_min}$ at $I_0$) to a first magnitude (e.g., $V_{c1}$ at $I_1$). In another example, the peak magnitudes of the current sensing signal 264 (e.g., $V_{cs}$) keep approximately constant (e.g., $V_{c1}$) if $I_1 \leq I_{out} < I_2$. In yet another example, the peak magnitudes of the current sensing signal 264 (e.g., $V_{cs}$) change with the output current (e.g., at a slope $S_{2p}$) if $I_2 \leq I_{out} < I_3$. In yet another example, the peak magnitudes of the current sensing signal 264 (e.g., $V_{cs}$) change from the first magnitude (e.g., $V_{c1}$ at $I_2$) to a second magnitude (e.g., $V_{e2}$ at $I_3$).

The controller 202 performs valley switching based at least in part on a drain-source voltage of the switch 220 in Region II (e.g., $I_3 \leq I_{out} \leq I_5$), according to some embodiments. For example, the controller 202 changes the driving signal 266 from the logic low level to the logic high level in response to one or more valleys being detected in the drain-source voltage of the switch 220 during a detection period for each switching cycle. In another example, in Region II, the switching frequency (e.g., $f_{sw}$) is between the minimum frequency (e.g., $f_{min}$) and the maximum frequency (e.g., $f_{max}$). In yet another example, if the output current 262 satisfies $I_3 \leq I_{out} < I_4$, the power conversion system 200 operates in a first valley switching mode. In yet another example, in the first valley switching mode, the maximum switching frequency (e.g., $f_{max}$) increases (e.g., linearly, or exponentially) with the output current 262, and the minimum switching frequency (e.g., $f_{min}$) increases (e.g., linearly, or exponentially) with the output current 262. In yet another example, if the output current 262 satisfies $I_4 \leq I_{out} \leq I_5$, the power conversion system 200 operates in a second valley switching mode. In yet another example, in the second valley switching mode, the maximum switching frequency (e.g., $f_{max}$) keeps approximately constant (e.g., $f_5$), and the minimum switching frequency (e.g., $f_{min}$) keeps approximately constant (e.g., $f_3$). In yet another example, in the second valley switching mode, an average of the switching frequency (e.g., $f_{avg}$) keeps approximately constant (e.g., $f_4$). As shown in FIG. 3(B), the current sensing signal 264 (e.g., $V_{cs}$) keeps approximately constant (e.g., $V_{c2}$) if $I_3 \leq I_{out} < I_4$, according to certain embodiments. For example, the current sensing signal 264 (e.g., $V_{cs}$) changes with the output current (e.g., at a slope $S_{3p}$) if $I_4 \leq I_{out} \leq I_5$. In another example, the current sensing signal 264 (e.g., $V_{cs}$) changes from the second magnitude (e.g., $V_{c2}$ at $I_4$) to a maximum magnitude (e.g., $V_{cs\_max}$ at $I_5$).

According to another embodiment, the minimum switching frequency (e.g., $f_{min}$) is associated with a maximum switching period (e.g., $T_{max}$), and the maximum switching frequency (e.g., $f_{max}$) is associated with a minimum switching period (e.g., $T_{min}$). For example, the controller 202 is configured to detect one or more valleys in the drain-source voltage of the switch 220 during a detection period which starts at the end of the minimum switching period (e.g., $T_{min}$) and ends at the end of the maximum switching period (e.g., $T_{max}$). In yet another example, in Region II, in response to the controller 202 detecting a valley appearing in the drain-source voltage of the switch 220 during the detection period for a particular switching cycle, the controller 202 is further configured to change the driving signal 266 upon the detection of the valley in order to start a new switching cycle. In another example, in Region I, in response to the controller 202 not detecting any valley in the drain-source voltage of the switch 220 during the detection period for a particular switching cycle, the controller 202 is further configured to change the driving signal 266 after the minimum switching period (e.g., $T_{min}$) in order to start a new switching cycle. In yet another example, in Region III, if the duration of the minimum switching period (e.g., $T_{min}$) is larger than a sum of an on-time period (e.g., $T_{on}$) during which the switch 220 is closed (e.g., being turned on) and a demagnetization period (e.g., $T_{demag}$) that begins at the end of the on-time period, the controller 202 is further configured to close (e.g., turn on) the switch 202 at the end of the demagnetization period in order to start a new switching cycle.

As discussed above and further emphasized here, FIGS. 3(A) and 3(B) are merely examples, which should not unduly limit the scope of the claims. One of ordinary skill in the art would recognize many variations, alternatives, and modifications. For example, there is a transition region when the power conversion system 200 changes from one operation mode (e.g., VPWM) to another operation mode (e.g., PFM), and in such a transition region, both the pulse width of the driving signal 266 and the switching frequency (e.g., $f_{sw}$) of the power conversion system 200 keep approximately constant, as shown in FIGS. 3(C) and 3(D).

FIG. 3(C) is a simplified diagram showing the relationship between the switching frequency and the output current 262 of the power conversion system 200 and FIG. 3(D) is a simplified diagram showing the relationship between peak magnitudes of the current sensing signal 264 and the output current 262 of the power conversion system 200 according to certain embodiments of the present invention. These diagrams are merely examples, which should not unduly limit the scope of the claims. One of ordinary skill in the art would recognize many variations, alternatives, and modifications. As shown in FIG. 3(C) and FIG. 3(D), Region IV corresponds to the output current 262 being larger than or equal to $I_6$ but smaller than $I_{11}$, Region V corresponds to the output current 262 being larger than or equal to $I_{11}$ but smaller than or equal to $I_{15}$, and Region VI corresponds to the output current 262 being larger than $I_{15}$ in magnitude.

The waveform 306 represents a relationship between the switching frequency (e.g., $f_{sw}$) and the output current 262 (e.g., $I_{out}$) in Region IV, and the waveform 308 represents a relationship between peak magnitudes of the current sensing signal 264 (e.g., $V_{cs}$) and the output current 262 (e.g., $I_{out}$) in Region IV. The waveform 382 represents a relationship between peak magnitudes of the current sensing signal 264 (e.g., $V_{cs}$) and the output current 262 (e.g., $I_{out}$) in Region V, the waveform 388 represents a relationship between a maximum switching frequency (e.g., $f_{max}'$) and the output current 262 (e.g., $I_{out}$) in Region V, and the waveform 384 represents a relationship between a minimum switching frequency (e.g., $f_{min}'$) and the output current 262 (e.g., $I_{out}$) in Region V. For example, if $I_{out} = I_6$, the power conversion system 200 is under no load conditions, and if $I_{out} = I_{15}$, the power conversion system 200 is under full load conditions. In another example, $I_6 \leq I_7 \leq I_8 \leq I_9 \leq I_{10} \leq I_{11} \leq I_{12} \leq I_{13} \leq I_{14} \leq I_{15}$.

As shown in FIGS. 3(C) and 3(D), if the output current 262 satisfies $I_6 \leq I_{out} < I_7$, the power conversion system 200 operates in a VPWM mode; if the output current 262 satisfies $I_8 \leq I_{out} < I_9$, the power conversion system 200 operates in a PFM mode; if the output current 262 satisfies $I_{10} \leq I_{out} < I_{11}$, the power conversion system 200 operates in a PWM mode, according to some embodiments. For example, if the output current 262 satisfies $I_7 \leq I_{out} < I_8$, the power conversion system 200 operates in a transition region between the VPWM mode and the PFM mode, and if the output current 262 satisfies $I_9 \leq I_{out} < I_{10}$, the power conversion system 200 operates in a transition region between the PFM mode and the PWM mode. According to one embodiment, if the output current 262 satisfies $I_{11} \leq I_{out} \leq I_{13}$, the power conversion system 200 operates in a third valley switching mode, and if the output current 262 satisfies $I_{14} \leq I_{out} \leq I_{15}$, the power conversion system 200 operates in a fourth valley switching mode. For example, if the output current 262 satisfies $I_{11} \leq I_{out} < I_{12}$, the power conversion system 200 operates in a transition region between the PWM mode and the third valley switching mode, and if the output current 262 satisfies $I_{13} \leq I_{out} < I_{14}$, the power conversion system 200 operates in a transition region between the third valley switching mode and the fourth valley switching mode.

As shown in FIG. 3(C), in Region IV, if the output current 262 satisfies $I_6 \leq I_{out} < I_8$, the switching frequency (e.g., $f_{sw}$) keeps approximately constant (e.g., $f_6$), according to certain embodiments. For example, the switching frequency (e.g., $f_{sw}$) increases (e.g., linearly or exponentially) with the output current 262 if the output current 262 satisfies $I_8 \leq I_{out} < I_9$. In another example, the switching frequency (e.g., $f_{sw}$) keeps approximately constant (e.g., $f_7$) if the output current 262 satisfies $I_9 \leq I_{out} < I_{11}$. As shown in FIG. 3(D), the peak magnitudes of the current sensing signal 264 (e.g., $V_{cs}$) change with the output current (e.g., at a slope $S_{4p}$) if $I_6 \leq I_{out} < I_7$, according to some embodiments. For example, the peak magnitudes of the current sensing signal 264 (e.g., $V_{cs}$) change from a minimum magnitude (e.g., $V_{cs\_min}$' at $I_6$) to a third magnitude (e.g., $V_{c3}$ at $I_7$). In another example, the peak magnitudes of the current sensing signal 264 (e.g., $V_{cs}$) keep approximately constant (e.g., $V_{c3}$) if $I_7 \leq I_{out} < I_{10}$. In yet another example, the peak magnitudes of the current sensing signal 264 (e.g., $V_{cs}$) change with the output current (e.g., at a slope $S_{5p}$) if $I_{10} \leq I_{out} < I_{11}$. In yet another example, the peak magnitudes of the current sensing signal 264 (e.g., $V_{cs}$) change from the third magnitude (e.g., $V_{c3}$ at $I_{10}$) to a fourth magnitude (e.g., $V_{c4}$ at $I_{11}$).

The controller 202 performs valley switching based at least in part on a drain-source voltage of the switch 220 in Region V (e.g., $I_{11} \leq I_{out} \leq I_{15}$), according to some embodiments. For example, the controller 202 changes the driving signal 266 from the logic low level to the logic high level in response to one or more valleys being detected in the drain-source voltage of the switch 220 during a detection period for each switching cycle. In another example, the switching frequency (e.g., $f_{sw}$) is between the minimum frequency (e.g., $f_{min}$') and the maximum frequency (e.g., $f_{max}$') In yet another example, in the third valley switching mode (e.g., $I_{11} \leq I_{out} < I_{13}$), the maximum switching frequency (e.g., $f_{max}$') increases (e.g., linearly, or exponentially) with the output current 262, and the minimum switching frequency (e.g., $f_{min}$') increases (e.g., linearly, or exponentially) with the output current 262. In yet another example, in the fourth valley switching mode (e.g., $I_{13} \leq I_{out} \leq I_{15}$), the maximum switching frequency (e.g., $f_{max}$') keeps approximately constant (e.g., $f_{10}$), and the minimum switching frequency (e.g., $f_{min}$') keeps approximately constant (e.g., $f_8$). In yet another example, in the fourth valley switching mode, an average of the switching frequency (e.g., $f_{avg}$') keeps approximately constant (e.g., $f_9$). As shown in FIG. 3(D), the current sensing signal 264 (e.g., $V_{cs}$) keeps approximately constant (e.g., $V_{c4}$) if $I_{11} \leq I_{out} < I_{14}$, according to certain embodiments. For example, the peak magnitudes of the current sensing signal 264 (e.g., $V_{cs}$) change with the output current (e.g., at a slope $S_{6p}$) if $I_{14} \leq I_{out} \leq I_{15}$. In another example, the peak magnitudes of the current sensing signal 264 (e.g., $V_{cs}$) change from the fourth magnitude (e.g., $V_{c4}$ at $I_{14}$) to a maximum magnitude (e.g., $V_{cs\_max}$' at $I_{15}$). In yet another example, the slope $S_{4p}$ is equal to the slope $S_{1p}$. In yet another example, the slope $S_{5p}$ is equal to the slope $S_{2p}$. In yet another example, the slope $S_{6p}$ is equal to the slope $S_{3p}$. In yet another example, $V_{cs\_max}$' is equal to $V_{cs\_max}$. In yet another example, $V_{cs\_min}$' is equal to $V_{cs\_min}$.

According to another embodiment, the minimum switching frequency (e.g., $f_{min}$') is associated with a maximum switching period (e.g., $T_{max}$'), and the maximum switching frequency (e.g., $f_{max}$') is associated with a minimum switching period (e.g., $T_{min}$'). For example, the controller 202 is configured to detect one or more valleys in the drain-source voltage of the switch 220 during a detection period which starts at the end of the minimum switching period (e.g., $T_{min}$') and ends at the end of the maximum switching period (e.g., $T_{max}$'). In yet another example, in Region V, in response to the controller 202 detecting a valley appearing in the drain-source voltage of the switch 220 during the detection period for a particular switching cycle, the controller 202 is further configured to change the driving signal 266 upon the detection of the valley in order to start a new switching cycle. In another example, in Region IV, in response to the controller 202 not detecting any valley in the drain-source voltage of the switch 220 during the detection period for a particular switching cycle, the controller 202 is further configured to change the driving signal 266 after the maximum switching period (e.g., $T_{max}$') in order to start a new switching cycle. In yet another example, in Region VI, if the duration of the maximum switching period (e.g., $T_{max}$') is smaller than a sum of an on-time period (e.g., $T_{on}$') during which the switch 220 is closed (e.g., being turned on) and a demagnetization period (e.g., $T_{demag}$') that begins at the end of the on-time period, the controller 202 is further configured to close (e.g., turn on) the switch 202 immediately at the end of the demagnetization period or shortly after the end of the demagnetization period in order to start a new switching cycle.

FIG. 4(A) is a simplified diagram showing the relationship between the switching frequency and the output current 262 of the power conversion system 200 and FIG. 4(B) is a simplified diagram showing the relationship between peak magnitudes of the current sensing signal 264 and the output current 262 of the power conversion system 200 according to some embodiments of the present invention. These diagrams are merely examples, which should not unduly limit the scope of the claims. One of ordinary skill in the art would recognize many variations, alternatives, and modifications. As shown in FIG. 4(A) and FIG. 4(B), Region VII corresponds to the output current 262 being larger than or equal to $I_{16}$ but smaller than $I_{20}$, Region VIII corresponds to the output current 262 being larger than or equal to $I_{20}$ but smaller than or equal to $I_{22}$, and Region IX corresponds to the output current 262 being larger than $I_{22}$ in magnitude.

The waveform 402 represents a relationship between the switching frequency (e.g., $f_{sw}$) and the output current 262 (e.g., $I_{out}$) in Region VII, and the waveform 404 represents a relationship between the peak magnitudes of the current sensing signal 264 (e.g., $V_{cs}$) and the output current 262 (e.g., $I_{out}$) in Region VII. The waveform 464 represents a relationship between the peak magnitudes of the current sensing signal 264 (e.g., $V_{cs}$) and the output current 262 (e.g., $I_{out}$) in Region VIII, the waveform 466 represents a relationship between a maximum switching frequency (e.g., $f_{max}$) and the output current 262 (e.g., $I_{out}$) in Region VIII, and the waveform 468 represents a relationship between a minimum switching frequency (e.g., $f_{min}$) and the output current 262 (e.g., $I_{out}$) in Region VIII. For example, if $I_{out}=I_{16}$, the power conversion system 200 is under no load conditions, and if $I_{out}=I_{22}$, the power conversion system 200 is under full load conditions. In another example, $I_{16} \leq I_{17} \leq I_{18} \leq I_{19} \leq I_{20} \leq I_{21} \leq I_{22}$.

As shown in FIG. 4(A), in Region VII, if the output current 262 satisfies $I_{16} \leq I_{out} < I_{19}$, the power conversion system 200 operates in a pulse-frequency-modulation (PFM) mode, and the switching frequency (e.g., $f_{sw}$) increases (e.g., linearly or exponentially) with the output current 262, according to certain embodiments. For example, the switching frequency (e.g., $f_{sw}$) changes from a frequency value (e.g., $f_{12}$ at $I_{16}$) to another frequency value (e.g., $f_{15}$ at $I_{19}$). In another example, if the output current 262 satisfies $I_{19} \leq I_{out} < I_{20}$, the power conversion system 200 operates in a pulse-width-modulation (PWM) mode, and the switching frequency (e.g., $f_{sw}$) keeps approximately constant (e.g., $f_{15}$). As shown in FIG. 4(B), if the output current 262 increases from $I_{16}$ to $I_{18}$, the peak magnitudes of the current sensing signal 264 (e.g., $V_{cs}$) keep approximately constant (e.g., $V_{c5}$), according to certain embodiments. For example, if the output current 262 continues to increase (e.g., at $I_{18}$), the peak magnitudes of the current sensing signal 264 (e.g., $V_{cs}$) change from the magnitude $V_{c5}$ to a minimum magnitude (e.g., $V_{cs\_min}"$). In another example, the peak magnitudes of the current sensing signal 264 (e.g., $V_{cs}$) decrease from the magnitude $V_{c5}$ to the minimum magnitude (e.g., $V_{cs\_min}"$) at a particular magnitude of the output current 262 (e.g., $I_{18}$). In yet another example, the peak magnitudes of the current sensing signal 264 (e.g., $V_{cs}$) decrease from the magnitude $V_{c5}$ to the minimum magnitude (e.g., $V_{cs\_min}"$) when the output current 262 increases slightly in magnitude (e.g., from $I_{18}$ to a magnitude slightly larger than $I_{18}$).

According to one embodiment, the peak magnitudes of the current sensing signal 264 (e.g., $V_{cs}$) keep at the minimum magnitude (e.g., $V_{cs\_min}"$) if $I_{18} \leq I_{out} < I_{19}$. For example, if the output current 262 decreases from $I_{19}$ to $I_{17}$, the peak magnitudes of the current sensing signal 264 (e.g., $V_{cs}$) keep approximately constant (e.g., $V_{cs\_min}"$). In another example, if the output current 262 continues to decrease (e.g., at $I_{17}$), the peak magnitudes of the current sensing signal 264 (e.g., $V_{cs}$) change from the minimum magnitude (e.g., $V_{cs\_min}"$) to the magnitude $V_{c5}$. In yet another example, the peak magnitudes of the current sensing signal 264 (e.g., $V_{cs}$) increase from the minimum magnitude (e.g., $V_{cs\_min}"$) to the magnitude $V_{c5}$ at a particular magnitude of the output current 262 (e.g., $I_{17}$). In yet another example, the peak magnitudes of the current sensing signal 264 (e.g., $V_{cs}$) increase from the minimum magnitude (e.g., $V_{cs\_min}"$) to the magnitude $V_{c5}$ when the output current 262 decreases slightly in magnitude (e.g., from $I_{17}$ to a magnitude slightly smaller than $I_{18}$). In yet another example, the peak magnitudes of the current sensing signal 264 (e.g., $V_{cs}$) keep at the magnitude $V_{c5}$ if $I_{16} \leq I_{out} < I_{17}$. In yet another example, the difference between the magnitude $V_{c5}$ and the minimum magnitude $V_{cs\_min}"$ relates to a hysteresis range. In yet another example, if $I_{19} \leq I_{out} < I_{20}$, the peak magnitudes of the current sensing signal 264 (e.g., $V_{cs}$) change with the output current (e.g., at a slope $S_{7p}$). In yet another example, the peak magnitudes of the current sensing signal 264 (e.g., $V_{cs}$) change from the minimum magnitude (e.g., $V_{cs\_min}"$ at $I_{19}$) to another magnitude (e.g., $V_{c6}$ at $I_{20}$). In yet another example, The controller 202 performs valley switching based at least in part on a drain-source voltage of the switch 220 in Region VIII (e.g., $I_{20} \leq I_{out} \leq I_{22}$), according to some embodiments. For example, the controller 202 changes the driving signal 266 from the logic low level to the logic high level in response to one or more valleys being detected in the drain-source voltage of the switch 220. In another example, in Region VIII, the switching frequency (e.g., $f_{sw}$) is between a minimum frequency (e.g., $f_{min}"$) and a maximum frequency (e.g., $f_{max}"$). In yet another example, if the output current 262 satisfies $I_{20} \leq I_{out} < I_{21}$, the power conversion system 200 operates in a fifth valley switching mode. In yet another example, in the fifth valley switching mode, the maximum switching frequency (e.g., $f_{max}"$) increases (e.g., linearly, or exponentially) with the output current 262, and the minimum switching frequency (e.g., $f_{min}"$) increases (e.g., linearly, or exponentially) with the output current 262. In yet another example, if the output current 262 satisfies $I_{21} \leq I_{out} \leq I_{22}$, the power conversion system 200 operates in a sixth valley switching mode. In yet another example, in the sixth valley switching mode, the maximum switching frequency (e.g., $f_{max}"$) keeps approximately constant (e.g., $f_{23}$), and the minimum switching frequency (e.g., $f_{min}"$) keeps approximately constant (e.g., $f_{22}$). In yet another example, in the sixth valley switching mode, an average of the switching frequency (e.g., $f_{avg}"$) keeps approximately constant (e.g., $f_{16}$). As shown in FIG. 4(B), the peak magnitudes of the current sensing signal 264 (e.g., $V_{cs}$) keep approximately constant (e.g., $V_{c6}$) if $I_{20} \leq I_{out} < I_{21}$, according to certain embodiments. For example, the peak magnitudes of the current sensing signal 264 (e.g., $V_{cs}$) change with the output current (e.g., at a slope $S_{8p}$) if $I_{21} \leq I_{out} \leq I_{22}$. In another example, the peak magnitudes of the current sensing signal 264 (e.g., $V_{cs}$) change from the magnitude $V_{c6}$ (e.g., at $I_{21}$) to a maximum magnitude (e.g., $V_{cs\_max}"$ at $I_{22}$).

According to another embodiment, the minimum switching frequency (e.g., $f_{min}"$) is associated with a maximum switching period (e.g., $T_{max}"$), and the maximum switching frequency (e.g., $f_{max}"$) is associated with a minimum switching period (e.g., $T_{min}"$). For example, the controller 202 is configured to detect one or more valleys in the drain-source voltage of the switch 220 during a detection period which starts at the end of the minimum switching period (e.g., $T_{min}"$) and ends at the end of the maximum switching period (e.g., $T_{max}"$). In yet another example, in Region VIII, in response to the controller 202 detecting a valley appearing in the drain-source voltage of the switch 220 during the detection period for a particular switching cycle, the controller 202 is further configured to change the driving signal 266 upon the detection of the valley in order to start a new switching cycle. In another example, in Region VII, in response to the controller 202 not detecting any valley in the drain-source voltage of the switch 220 during the detection period for a particular switching cycle, the controller 202 is further configured to change the driving signal 266 after the maximum switching period (e.g., $T_{max}"$) in order to start a new switching cycle. In yet another example, in Region IX, if the duration of the maximum switching period (e.g., $T_{max}"$) is smaller than a sum of an on-time period (e.g., $T_{on}"$) during which the switch 220 is closed (e.g., being turned on) and a demagnetization period (e.g., $T_{demag}"$) that begins at the end of the on-time period, the controller 202 is further configured to close (e.g., turn on) the switch 202 immediately at the end of the demagnetization period or shortly after the end of the demagnetization period in order to start a new switching cycle.

As discussed above and further emphasized here, FIGS. 4(A) and 4(B) are merely examples, which should not unduly limit the scope of the claims. One of ordinary skill in the art would recognize many variations, alternatives, and modifications. For example, there is a transition region when the power conversion system 200 changes from one operation mode (e.g., PFM) to another operation mode (e.g., PWM), and in such a transition region, both the pulse width of the driving signal 266 and the switching frequency (e.g., $f_{sw}$) of the power conversion system 200 keep approximately constant, as shown in FIGS. 4(C) and 4(D).

FIG. 4(C) is a simplified diagram showing the relationship between the switching frequency and the output current 262 of the power conversion system 200 and FIG. 4(D) is a simplified diagram showing the relationship between peak magnitudes of the current sensing signal 264 and the output current 262 of the power conversion system 200 according to certain embodiments of the present invention. These diagrams are merely examples, which should not unduly limit the scope of the claims. One of ordinary skill in the art would recognize many variations, alternatives, and modifications. As shown in FIG. 4(C) and FIG. 4(D), Region X corresponds to the output current 262 being larger than or equal to $I_{23}$ but smaller than $I_{28}$, Region XI corresponds to the output current 262 being larger than or equal to $I_{28}$ but smaller than or equal to $I_{32}$, and Region XII corresponds to the output current 262 being larger than $I_{32}$ in magnitude.

The waveform 406 represents the switching frequency (e.g., $f_{sw}$) as a function of the output current 262 (e.g., $I_{out}$) in Region X, and the waveform 408 represents the peak magnitudes of the current sensing signal 264 (e.g., $V_{cs}$) as a function of the output current 262 (e.g., $I_{out}$) in Region X. The waveform 482 represents a relationship between the peak magnitudes of the current sensing signal 264 (e.g., $V_{cs}$) and the output current 262 (e.g., $I_{out}$) in Region XI, the waveform 488 represents a relationship between a maximum switching frequency (e.g., $f_{max}'''$) and the output current 262 (e.g., $I_{out}$) in Region XI, and the waveform 484 represents a relationship between a minimum switching frequency (e.g., $f_{min}'''$) and the output current 262 (e.g., $I_{out}$) in Region XI. For example, if $I_{out}=I_{23}$, the power conversion system 200 is under no load conditions, and if $I_{out}=I_{32}$, the power conversion system 200 is under full load conditions. In another example, $I_{23} \leq I_{24} \leq I_{25} \leq I_{26} \leq I_{27} \leq I_{28} \leq I_{29} \leq I_{30} \leq I_{31} \leq I_{32}$.

As shown in FIG. 4(C) and FIG. 4(D), if the output current 262 satisfies $I_{23} \leq I_{out} < I_{26}$, the power conversion system 200 operates in a pulse-frequency-modulation (PFM) mode, and if the output current 262 satisfies $I_{27} \leq I_{out} < I_{28}$, the power conversion system 200 operates in a pulse-width-modulation (PWM) mode, according to certain embodiments. For example, if the output current 262 satisfies $I_{26} \leq I_{out} < I_{27}$, the power conversion system 200 operates in a transition region between the PFM mode and the PWM mode. In another example, if the output current 262 satisfies $I_{28} \leq I_{out} \leq I_{30}$, the power conversion system 200 operates in a seventh valley switching mode, and if the output current 262 satisfies $I_{31} \leq I_{out} \leq I_{32}$, the power conversion system 200 operates in an eighth valley switching mode. In yet another example, if the output current 262 satisfies $I_{28} \leq I_{out} < I_{29}$, the power conversion system 200 operates in a transition region between the PWM mode and the seventh valley switching mode. In yet another example, if the output current 262 satisfies $I_{30} \leq I_{out} < I_{31}$, the power conversion system 200 operates in a transition region between the seventh valley switching mode and the eighth valley switching mode.

As shown in FIG. 4(C), in Region X, if the output current 262 satisfies $I_{23} \leq I_{out} < I_{26}$, the switching frequency (e.g., $f_{sw}$) increases (e.g., linearly or exponentially) with the output current 262, according to certain embodiments. For example, the switching frequency (e.g., $f_{sw}$) changes from a frequency value (e.g., $f_{17}$ at $I_{23}$) to another frequency value (e.g., $f_{20}$ at $I_{26}$). In another example, if the output current 262 satisfies $I_{26} \leq I_{out} < I_{29}$, the switching frequency (e.g., $f_{sw}$) keeps approximately constant (e.g., $f_{20}$). As shown in FIG. 4(D), if the output current 262 increases from $I_{23}$ to $I_{25}$, the current sensing signal 264 (e.g., $V_{cs}$) keeps approximately constant (e.g., $V_{c7}$), according to certain embodiments. For example, if the output current 262 continues to increase (e.g., at $I_{25}$), the peak magnitudes of the current sensing signal 264 (e.g., $V_{cs}$) change from the magnitude $V_{c7}$ to a minimum magnitude (e.g., $V_{cs\_min}'''$). In another example, the peak magnitudes of the current sensing signal 264 (e.g., $V_{cs}$) keep at the minimum magnitude (e.g., $V_{cs\_min}'''$) if $I_{25} \leq I_{out} < I_{27}$. In yet another example, if the output current 262 decreases from $I_{27}$ to $I_{24}$, the peak magnitudes of the current sensing signal 264 (e.g., $V_{cs}$) keep approximately constant (e.g., $V_{cs\_min}'''$). In yet another example, if the output current 262 continues to decrease (e.g., at $I_{24}$), the peak magnitudes of the current sensing signal 264 (e.g., $V_{cs}$) change from the minimum magnitude (e.g., $V_{cs\_min}'''$) to the magnitude $V_{c7}$. In yet another example, the peak magnitudes of the current sensing signal 264 (e.g., $V_{cs}$) keep at the magnitude $V_{c7}$ if $I_{23} \leq I_{out} < I_{24}$. In yet another example, the difference between the magnitude $V_{c7}$ and the minimum magnitude $V_{cs\_min}'''$ relates to a hysteresis range. In yet another example, if $I_{27} \leq I_{out} < I_{28}$, the peak magnitudes of the current sensing signal 264 (e.g., $V_{cs}$) change with the output current (e.g., at a slope $S_{9p}$). In yet another example, the peak magnitudes of the current sensing signal 264 (e.g., $V_{cs}$) change from the minimum magnitude (e.g., $V_{cs\_min}'''$ at $I_{27}$) to another magnitude (e.g., $V_{c8}$ at $I_{28}$).

The controller 202 performs valley switching based at least in part on a drain-source voltage of the switch 220 in Region XI (e.g., $I_{28} \leq I_{out} \leq I_{32}$), according to some embodiments. For example, the controller 202 changes the driving signal 266 from the logic low level to the logic high level in response to one or more valleys being detected in the drain-source voltage of the switch 220 during a detection period for each switching cycle. In another example, the switching frequency (e.g., $f_{sw}$) is between the minimum frequency (e.g., $f_{min}'''$) and the maximum frequency (e.g., $f_{max}'''$). In yet another example, in the seventh valley switching mode (e.g., $I_{28} \leq I_{out} < I_{31}$), the maximum switching frequency (e.g., $f_{max}'''$) increases (e.g., linearly, or exponentially) with the output current 262, and the minimum switching frequency (e.g., $f_{min}'''$) increases (e.g., linearly, or exponentially) with the output current 262. In yet another example, in the eighth valley switching mode (e.g., $I_{31} \leq I_{out} \leq I_{32}$), the maximum switching frequency (e.g., $f_{max}'''$) keeps approximately constant (e.g., $f_{25}$), and the minimum switching frequency (e.g., $f_{min}'''$) keeps approximately constant (e.g., $f_{24}$). In yet another example, in the eighth valley switching mode, an average of the switching frequency (e.g., $f_{avg}'''$) keeps approximately constant (e.g., $f_{21}$). In another example, the peak magnitudes of the current sensing signal 264 (e.g., $V_{cs}$) keep approximately constant (e.g., $V_{c8}$) if $I_{28} \leq I_{out} < I_{31}$. In yet another example, the peak magnitudes of the current sensing signal 264 (e.g., $V_{cs}$) change with the output current (e.g., at a slope $S_{10p}$) if $I_{31} \leq I_{out} < I_{32}$. In yet another example, the peak magnitudes of the current sensing signal 264 (e.g., $V_{cs}$) change from the magnitude $V_{c8}$ (e.g., at $I_{31}$) to a maximum magnitude (e.g., $V_{cs\_max}'''$ at $I_{32}$). In yet another example, the slope $S_{9p}$ is equal to the slope $S_{7p}$. In yet another example, the slope $S_{10p}$ is equal to the slope $S_{8p}$. In yet another example, $V_{cs\_max}'''$ is equal to $V_{cs\_max}''$. In yet another example, $V_{cs\_min}'''$ is equal to $V_{cs\_min}''$. In yet another example, $f_{max}'''$ is equal to $f_{max}''$. In yet another example, $f_{min}'''$ is equal to $f_{min}''$.

FIG. 5 is a simplified diagram showing the controller 202 as part of the power conversion system 200 according to an embodiment of the present invention. This diagram is merely an example, which should not unduly limit the scope of the claims. One of ordinary skill in the art would recognize many variations, alternatives, and modifications. The controller 202 includes an error amplifier 502, a sampling component 504, a capacitor 506, a dynamic-response component 508, a demagnetization detector 510, a valley detector 512, a current-control component 514, a cable compensation component 516, a low-pass-filter component 518, a jittering component 520, a timer component 522, a mode-control component 524, a logic unit 526, and a driving component 528. In addition, the controller 202 includes a reference-signal generator 530, a leading-edge-blanking (LEB) component 532, comparators 534, 538 and 540, a peak-current controller 536, and a summation component 542. The controller 202 further includes a terminal 296 (e.g., terminal GND).

As shown in FIG. 5, the sampling component 504 samples the signal 268 from the terminal 294 (e.g., terminal FB) and generates a sampled signal 550 together with the capacitor 506, according to certain embodiments. For example, the summation component 542 receives a reference signal 544 from the reference-signal generator 530 and a compensation signal 548 from the cable compensation component 516 and outputs a signal 546. In another example, the error amplifier 502 receives the sampled signal 550 and the signal 546 and outputs an amplified signal 552 (e.g., $V_{comp}$) which indicates a difference between the sampled signal 550 and the signal 546 and is associated with the output current 262.

According to one embodiment, the amplified signal 552 is received by the low-pass-filter component 518 which outputs a filtered signal 586 to the cable compensation component 516. For example, the dynamic-response component 508 receives the signal 268 and outputs a signal 572 to the timer component 522. In another example, the timer component 522 receives the amplified signal 552, the driving signal 266 and a jittering signal 584 from the jittering component 520 and outputs a timing signal 558 (e.g., a pulse signal) to the logic unit 526. In another example, the demagnetization detector 510 detects information associated with the demagnetization process of the power conversion system 200 (e.g., the beginning and the end of the demagnetization process) based on the signal 268 and outputs a demagnetization-detection signal 560 to the logic unit 526. In yet another example, the valley detector 512 detects one or more valleys in the drain-source voltage of the switch 220 and outputs a valley-detection signal 562 to the logic unit 526. In yet another example, the amplified signal 552 is received by the mode-control component 524 which outputs a signal 554 to the logic unit 526 in order to affect the operation mode of the power conversion system 200. In yet another example, the timing signal 558 is associated with a maximum switching frequency value which can be adjusted based on the jittering signal 584. In yet another example, a pulse in the timing signal 558 has a width inversely proportional to the maximum switching frequency value. In yet another example, the maximum switching frequency value is inversely proportional to a duration of a minimum time period which is proportional to the pulse width of the timing signal 558.

According to another embodiment, the current-control component 514 receives the demagnetization-detection signal 560, a reference signal 564 from the reference-signal generator 530, and a signal 566 from the LEB component 532 and outputs a signal 586 to the logic unit 526. For example, the comparator 534 receives a threshold signal 568 (e.g., $V_{CS\_max}$) and the signal 566 and outputs a comparison signal 570 to the logic unit 526. In another example, the comparator 540 receives a threshold signal 576 (e.g., $V_{CS\_min}$) and the signal 566 and outputs a comparison signal 580 to the logic unit 526. In yet another example, the peak-current controller 536 receives the signal 572 and the amplified signal 552 (e.g., $V_{comp}$) and outputs a signal 574 (e.g., $V_{CS\_PK}$). In yet another example, the comparator 538 compares the signal 574 (e.g., $V_{CS\_PK}$) and the signal 566 associated with the current sensing signal 264 (e.g., $V_{cs}$) and outputs a comparison signal 578 to the logic unit 526 in order to affect the primary current 270. In yet another example, if the signal 566 becomes larger than the signal 574 (e.g., $V_{CS\_PK}$) in magnitude, the comparator 538 outputs the comparison signal 578 to open (e.g., turn off) the switch 220.

FIG. 6(A) is a simplified diagram showing the relationship between the switching frequency and the amplified signal 552 and FIG. 6(B) is a simplified diagram showing the relationship between peak magnitudes of the current sensing signal 264 and the amplified signal 552 according to some embodiments of the present invention. These diagrams are merely examples, which should not unduly limit the scope of the claims. One of ordinary skill in the art would recognize many variations, alternatives, and modifications. These diagrams are merely examples, which should not unduly limit the scope of the claims. One of ordinary skill in the art would recognize many variations, alternatives, and modifications. For example, $V_0$, $V_1$, $V_2$, $V_3$, $V_4$, and $V_5$ correspond to $I_0$, $I_1$, $I_2$, $I_3$, $I_4$, and $I_5$, respectively. As shown in FIG. 6(A) and FIG. 6(B), Region I corresponds to the amplified signal 552 (e.g., $V_{comp}$) being larger than or equal to $V_0$ but smaller than $V_3$, Region II corresponds to the amplified signal 552 (e.g., $V_{comp}$) being larger than or equal to $V_3$ but smaller than or equal to $V_5$, and Region III corresponds to the amplified signal 552 (e.g., $V_{comp}$) being larger than $V_5$ in magnitude.

The waveform 602 represents a relationship between the switching frequency (e.g., $f_{sw}$) and the amplified signal 552 (e.g., $V_{comp}$) in Region I, and the waveform 604 represents a relationship between the peak magnitudes of the current sensing signal 264 (e.g., $V_{cs}$) and the amplified signal 552 (e.g., $V_{comp}$) in Region I. The waveform 664 represents a relationship between the peak magnitudes of the current sensing signal 264 (e.g., $V_{cs}$) and the amplified signal 552 (e.g., $V_{comp}$) in Region II, the waveform 666 represents a relationship between a maximum switching frequency (e.g., $f_{max}$) and the amplified signal 552 (e.g., $V_{comp}$) in Region II, and the waveform 668 represents a relationship between a minimum switching frequency (e.g., $f_{min}$) and the amplified signal 552 (e.g., $V_{comp}$) in Region II. For example, if $V_{comp}=V_0$, the power conversion system 200 is under no load conditions, and if $V_{comp}=V_5$, the power conversion system 200 is under full load conditions. In another example, $V_0 \leq V_1 \leq V_2 \leq V_3 \leq V_4 \leq V_5$.

As discussed above and further emphasized here, FIGS. 6(A) and 6(B) are merely examples, which should not unduly limit the scope of the claims. One of ordinary skill in the art would recognize many variations, alternatives, and modifications. For example, there is a transition region when the power conversion system 200 changes from one operation mode (e.g., VPWM) to another operation mode (e.g., PFM), and in such a transition region, both the pulse width of the driving signal 266 and the switching frequency (e.g., $f_{sw}$) of the power conversion system 200 keep approximately constant, as shown in FIGS. 6(C) and 6(D).

FIG. 6(C) is a simplified diagram showing the relationship between the switching frequency and the amplified signal 552 and FIG. 6(D) is a simplified diagram showing the relationship between peak magnitudes of the current sensing signal 264 and the amplified signal 552 according to certain embodiments of the present invention. These diagrams are merely examples, which should not unduly limit the scope of the claims. One of ordinary skill in the art would recognize many variations, alternatives, and modifications. For example, $V_6$, $V_7$, $V_8$, $V_9$, $V_{10}$, $V_{11}$, $V_{12}$, $V_{13}$, $V_{14}$, and $V_{15}$ correspond to $I_6$, $I_7$, $I_8$, $I_9$, $I_{10}$, $I_{11}$, $I_{12}$, $I_{13}$, $I_{14}$, and $I_{15}$, respectively. As shown in FIG. 6(C) and FIG. 6(D), Region IV corresponds to the amplified signal 552 (e.g., $V_{comp}$) being larger than or equal to $V_6$ but smaller than $V_{11}$, Region V corresponds to the amplified signal 552 (e.g., $V_{comp}$) being larger than or equal to $V_{11}$ but smaller than or equal to $V_{15}$, and Region VI corresponds to the amplified signal 552 (e.g., $V_{comp}$) being larger than $V_{15}$ in magnitude.

The waveform 606 represents a relationship between the switching frequency (e.g., $f_{sw}$) and the amplified signal 552 (e.g., $V_{comp}$) in Region IV, and the waveform 608 represents a relationship between the peak magnitudes of the current sensing signal 264 (e.g., $V_{cs}$) and the amplified signal 552 (e.g., $V_{comp}$) in Region IV. The waveform 682 represents a relationship between the peak magnitudes of the current sensing signal 264 (e.g., $V_{cs}$) and the amplified signal 552 (e.g., $V_{comp}$) in Region V, the waveform 688 represents a relationship between a maximum switching frequency (e.g., $f_{max}'$) and the amplified signal 552 (e.g., $V_{comp}$) in Region V, and the waveform 684 represents a relationship between a minimum switching frequency (e.g., $f_{min}'$) and the amplified signal 552 (e.g., $V_{comp}$) in Region V. For example, if $V_{comp}=V_6$, the power conversion system 200 is under no load conditions, and if $V_{comp}=V_{15}$, the power conversion system 200 is under full load conditions. In another example, $V_6 \leq V_7 \leq V_8 \leq V_9 \leq V_{10} \leq V_{11} \leq V_{12} \leq V_{13} \leq V_{14} \leq V_{15}$.

FIG. 7(A) is a simplified diagram showing the relationship between the switching frequency and the amplified signal 552 and FIG. 7(B) is a simplified diagram showing the relationship between peak magnitudes of the current sensing signal 264 and the amplified signal 552 according to some embodiments of the present invention. These diagrams are merely examples, which should not unduly limit the scope of the claims. One of ordinary skill in the art would recognize many variations, alternatives, and modifications. For example, $V_{16}$, $V_{17}$, $V_{18}$, $V_{19}$, $V_{20}$, $V_{21}$, and $V_{22}$ correspond to $I_{16}$, $I_{17}$, $I_{18}$, $I_{19}$, $I_{20}$, $I_{21}$, and $I_{22}$, respectively. As shown in FIG. 7(A) and FIG. 7(B), Region VII corresponds to the amplified signal 552 (e.g., $V_{comp}$) being larger than or equal to $V_{16}$ but smaller than $V_{20}$, Region VIII corresponds to the amplified signal 552 (e.g., $V_{comp}$) being larger than or equal to $V_{20}$ but smaller than or equal to $V_{22}$, and Region IX corresponds to the amplified signal 552 (e.g., $V_{comp}$) being larger than $V_{22}$ in magnitude.

The waveform 702 represents a relationship between the switching frequency (e.g., $f_{sw}$) and the amplified signal 552 (e.g., $V_{comp}$) in Region VII, and the waveform 704 represents a relationship between the peak magnitudes of the current sensing signal 264 (e.g., $V_{cs}$) and the amplified signal 552 (e.g., $V_{comp}$) in Region VII. The waveform 764 represents a relationship between the peak magnitudes of the current sensing signal 264 (e.g., $V_{cs}$) and the amplified signal 552 (e.g., $V_{comp}$) in Region VIII, the waveform 766 represents a relationship between a maximum switching frequency (e.g., $f_{max}$) and the amplified signal 552 (e.g., $V_{comp}$) in Region VIII, and the waveform 768 represents a relationship between a minimum switching frequency (e.g., $f_{min}$) and the amplified signal 552 (e.g., $V_{comp}$) in Region VIII. For example, if $V_{comp}=V_{16}$, the power conversion system 200 is under no load conditions, and if $V_{comp}=V_{22}$, the power conversion system 200 is under full load conditions. In another example, $V_{16} \leq V_{17} \leq V_{18} \leq V_{19} \leq V_{20} \leq V_{21} \leq V_{22}$.

As discussed above and further emphasized here, FIGS. 7(A) and 7(B) are merely examples, which should not unduly limit the scope of the claims. One of ordinary skill in the art would recognize many variations, alternatives, and modifications. For example, there is a transition region when the power conversion system 200 changes from one operation mode (e.g., PFM) to another operation mode (e.g., PWM), and in such a transition region, both the pulse width of the driving signal 266 and the switching frequency (e.g., $f_{sw}$) of the power conversion system 200 keep approximately constant, as shown in FIGS. 7(C) and 7(D).

FIG. 7(C) is a simplified diagram showing the relationship between the switching frequency and the amplified signal 552 and FIG. 7(D) is a simplified diagram showing the relationship between peak magnitudes of the current sensing signal 264 and the amplified signal 552 according to certain embodiments of the present invention. These diagrams are merely examples, which should not unduly limit the scope of the claims. One of ordinary skill in the art would recognize many variations, alternatives, and modifications. For example, $V_{23}$, $V_{24}$, $V_{25}$, $V_{26}$, $V_{27}$, $V_{28}$, $V_{29}$, $V_{30}$, $V_{31}$, and $V_{32}$ correspond to $I_{23}$, $I_{24}$, $I_{25}$, $I_{26}$, $I_{27}$, $I_{28}$, $I_{29}$, $I_{30}$, $I_{31}$, and $I_{32}$, respectively. As shown in FIG. 7(C) and FIG. 7(D), Region X corresponds to the amplified signal 552 (e.g., $V_{comp}$) being larger than or equal to $V_{23}$ but smaller than $V_{28}$, Region XI corresponds to the amplified signal 552 (e.g., $V_{comp}$) being larger than or equal to $V_{28}$ but smaller than or equal to $V_{32}$, and Region XII corresponds to the amplified signal 552 (e.g., $V_{comp}$) being larger than $V_{32}$ in magnitude.

The waveform 706 represents the switching frequency (e.g., $f_{sw}$) as a function of the amplified signal 552 (e.g., $V_{comp}$) in Region X, and the waveform 708 represents the peak magnitudes of the current sensing signal 264 (e.g., $V_{cs}$) as a function of the amplified signal 552 (e.g., $V_{comp}$) in Region X. The waveform 782 represents a relationship between the peak magnitudes of the current sensing signal 264 (e.g., $V_{cs}$) and the amplified signal 552 (e.g., $V_{comp}$) in Region XI, the waveform 788 represents a relationship between a maximum switching frequency (e.g., $f_{max}'''$) and the amplified signal 552 (e.g., $V_{comp}$) in Region XI, and the waveform 784 represents a relationship between a minimum switching frequency (e.g., $f_{min}'''$) and the amplified signal 552 (e.g., $V_{comp}$) in Region XI. For example, if $V_{comp}=V_{23}$, the power conversion system 200 is under no load conditions, and if $V_{comp}=V_{32}$, the power conversion system 200 is under full load conditions. In another example, $V_{23} \leq V_{24} \leq V_{25} \leq V_{26} \leq V_{27} \leq V_{28} \leq V_{29} \leq V_{30} \leq V_{31} \leq V_{32}$.

FIGS. 8(A), 8(B) and 8(C) are simplified timing diagrams under different load conditions for the power conversion system 200 according to some embodiments of the present invention. These diagrams are merely examples, which should not unduly limit the scope of the claims. One of ordinary skill in the art would recognize many variations, alternatives, and modifications.

FIG. 8(A) shows a timing diagram under heavy load conditions for the power conversion system 200 according to an embodiment of the present invention. For example, FIG. 8(A) shows the timing diagram for the power conversion system 200 operating in Region III (e.g., as shown in FIG. 3(A), FIG. 3(B), FIG. 6(A) and/or FIG. 6(B)), in Region VI (e.g., as shown in FIG. 3(C), FIG. 3(D), FIG. 6(C) and/or FIG. 6(D)), in Region IX (e.g., as shown in FIG. 4(A), FIG. 4(B), FIG. 7(A) and/or FIG. 7(B)), and/or in Region XII (e.g., as shown in FIG. 4(C), FIG. 4(D), FIG. 7(C) and/or FIG. 7(D)).

As shown in FIG. 8(A), the waveform 802 represents the driving signal 266 as a function of time, the waveform 804 represents the current sensing signal 264 as a function of time, the waveform 806 represents the demagnetization-detection signal 560 as a function of time, and the waveform 808 represents the drain-source voltage of the switch 220 as a function of time. Four time periods are shown in FIG. 8(A). An on-time period $T_{on1}$ starts at time $t_0$ and ends at time $t_1$, and a demagnetization period $T_{demag1}$ starts at the time $t_1$ and ends at time $t_4$. In addition, a minimum time period $T_{min1}$ that corresponds to a maximum switching frequency value starts at the time $t_0$ and ends at time $t_2$, and a maximum time period $T_{max1}$ that corresponds to a minimum switching frequency value starts at the time $t_0$ and ends at time $t_3$. For example, $t_0 \le t_1 \le t_2 \le t_3 \le t_4 \le t_5$. In another example, the minimum time period $T_{min1}$ is associated with the timing signal 558 and is affected by the jittering signal 584. As an example, the maximum time period $T_{max1}$ is determined as $$T_{max1} = \frac{1}{f_{min}},$$

where $f_{min}$ represents a minimum switching frequency value. As another example, the minimum time period $T_{min1}$ is determined as $$T_{min1} = \frac{1}{f_{max}},$$

where $f_{max}$ represents a maximum switching frequency value.

As shown in FIG. 8(A), if the maximum time period $T_{max1}$ is smaller in duration than a sum of the on-time period $T_{on1}$ and the demagnetization time period $T_{demag1}$, a next switching cycle begins after the demagnetization time period $T_{demag1}$, according to certain embodiments. In one embodiment, at $t_o$, the driving signal 266 changes from the logic low level to the logic high level, and a switching cycle begins. For example, at $t_1$, the driving signal 266 changes from the logic high level to the logic low level, and the demagnetization-detection signal 560 changes from the logic low level to the logic high level indicating the beginning of the demagnetization process. In another example, the maximum time period $T_{max1}$ ends at $t_3$, and thereafter, the demagnetization-detection signal 560 changes from the logic high level to the logic low level at $t_4$. In yet another example, a next switching cycle begins at $t_5$ which is later than the falling edge of the demagnetization-detection signal 560 (e.g., at $t_4$). For example, the duration of the maximum time period $T_{max1}$ is constant. In another example, the duration of the maximum time period $T_{max1}$ is not constant. For example, the duration of the minimum time period $T_{min1}$ is constant. In another example, the duration of the minimum time period $T_{min1}$ is not constant.

FIG. 8(B) shows a timing diagram for the power conversion system 200 operating in a valley switching mode, according to another embodiment of the present invention. For example, FIG. 8(B) shows the timing diagram for the power conversion system 200 operating in Region II (e.g., as shown in FIG. 3(A), FIG. 3(B), FIG. 6(A) and/or FIG. 6(B)), in Region V (e.g., as shown in the FIG. 3(C), FIG. 3(D), FIG. 6(C) and/or FIG. 6(D)), in Region VIII (e.g., as shown in FIG. 4(A), FIG. 4(B), FIG. 7(A) and/or FIG. 7(B)), and/or in Region XI (e.g., as shown in FIG. 4(C), FIG. 4(D), FIG. 7(C) and/or FIG. 7(D)).

As shown in FIG. 8(B), the waveform 810 represents the driving signal 266 as a function of time, the waveform 812 represents the current sensing signal 264 as a function of time, the waveform 814 represents the demagnetization-detection signal 560 as a function of time, and the waveform 816 represents the drain-source voltage of the switch 220 as a function of time. Four time periods are shown in FIG. 8(B). An on-time period $T_{on2}$ starts at time $t_6$ and ends at time $t_7$, a demagnetization period $T_{demag2}$ starts at the time $t_7$ and ends at time $t_9$. In addition, a minimum time period $T_{min2}$ that corresponds to a maximum switching frequency value starts at the time $t_6$ and ends at time $t_8$, and a maximum time period $T_{max2}$ that corresponds to a minimum switching frequency value starts at the time $t_6$ and ends at time $t_{11}$. For example, $t_6 \le t_7 \le t_8 \le t_9 \le t_{10} \le t_{11}$. In another example, the minimum time period $T_{min2}$ is associated with the timing signal 558 and is affected by the jittering signal 584.

According to one embodiment, at $t_6$, the driving signal 266 changes from the logic low level to the logic high level, and a switching cycle begins. For example, at $t_7$, the driving signal 266 changes from the logic high level to the logic low level, and the demagnetization-detection signal 560 changes from the logic low level to the logic high level indicating the beginning of the demagnetization process. In another example, the demagnetization-detection signal 560 changes from the logic high level to the logic low level at $t_9$ which is earlier than the end of the maximum time period $T_{max2}$ (e.g., $t_{11}$). In yet another example, as shown by the waveform 816, a valley appears (e.g., at $t_{10}$) in the drain-source voltage of the switch 220 between the end of the minimum time period $T_{min2}$ (e.g., $t_8$) and the end of the maximum time period $T_{max2}$ (e.g., $t_{11}$). In yet another example, in response to the detection of the valley (e.g., at $t_{10}$), a next switching cycle begins and the driving signal 266 changes from the logic low level to the logic high level again. For example, the duration of the maximum time period $T_{max2}$ is constant. In another example, the duration of the maximum time period $T_{max2}$ is not constant. For example, the duration of the minimum time period $T_{min2}$ is constant. In another example, the duration of the minimum time period $T_{min2}$ is not constant. In yet another example, the valleys appear at $t_6$ and $t_{10}$ each correspond to a local minimum of the drain-source voltage of the switch 220. In yet another example, if a valley is detected at $t_{11}$, the next switching cycle begins at $t_{11}$.

FIG. 8(C) shows a timing diagram under light load conditions for the power conversion system 200, according to yet another embodiment of the present invention. For example, FIG. 8(C) shows the timing diagram for the power conversion system 200 operating in Region I (e.g., as shown in FIG. 3(A), FIG. 3(B), FIG. 6(A) and/or FIG. 6(B)), in Region IV (e.g., as shown in FIG. 3(C), FIG. 3(D), FIG. 6(C) and/or FIG. 6(D)), in Region VII (e.g., as shown in FIG. 4(A), FIG. 4(B), FIG. 7(A) and/or FIG. 7(B)), and/or in Region X (e.g., as shown in FIG. 4(C), FIG. 4(D), FIG. 7(C) and/or FIG. 7(D)).

As shown in FIG. 8(C), the waveform 818 represents the driving signal 266 as a function of time, the waveform 820 represents the current sensing signal 264 as a function of time, the waveform 822 represents the demagnetization-detection signal 560 as a function of time, and the waveform 824 represents the drain-source voltage of the switch 220 as a function of time. Four time periods are shown in FIG. 8(C). An on-time period $T_{on3}$ starts at time $t_{12}$ and ends at time $t_{13}$, a demagnetization period $T_{demag3}$ starts at the time $t_{13}$ and ends at time $t_{14}$. In addition, a minimum time period $T_{min3}$ that corresponds to a maximum switching frequency value starts at the time $t_{12}$ and ends at time $t_{15}$, and a maximum time period $T_{max3}$ that corresponds to a minimum switching frequency value starts at the time $t_{12}$ and ends at time $t_{16}$. For example, $t_{12} \leq t_{13} \leq t_{14} \leq t_{15} \leq t_{16}$. In another example, the minimum time period $T_{min3}$ is associated with the timing signal 558 and is affected by the jittering signal 584.

According to one embodiment, at $t_{12}$, the driving signal 266 changes from the logic low level to the logic high level, and a switching cycle begins. For example, at $t_{13}$, the driving signal 266 changes from the logic high level to the logic low level, and the demagnetization-detection signal 560 changes from the logic low level to the logic high level indicating the beginning of the demagnetization process. In another example, the demagnetization-detection signal 560 changes from the logic high level to the logic low level at $t_{14}$ which is earlier than the end of the maximum time period $T_{max3}$ (e.g., $t_{16}$). In yet another example, no valley is detected between the end of the minimum time period $T_{min3}$ (e.g., at $t_{15}$) and the end of the maximum time period $T_{max3}$ (e.g., at $t_{16}$). In yet another example, a next switching cycle begins when the maximum time period $T_{max3}$ ends (e.g., at $t_{16}$). For example, the duration of the maximum time period $T_{max3}$ is constant. In another example, the duration of the maximum time period $T_{max3}$ is not constant. For example, the duration of the minimum time period $T_{min3}$ is constant. In another example, the duration of the minimum time period $T_{min3}$ is not constant.

FIG. 9 is a simplified diagram showing a method for operations of the power conversion system 200 according to one embodiment of the present invention. This diagram is merely an example, which should not unduly limit the scope of the claims. One of ordinary skill in the art would recognize many variations, alternatives, and modifications.

The method 900 includes at least a process 902 for closing (e.g., turning on) the switch 220 for a particular switching cycle, a process 904 for activating the timer component 522 to count time, a process 906 for determining an end of a minimum time period (e.g., $1/f_{max}$) based on the time counted by the timer component 522, a process 908 for comparing the duration of a maximum time period which equals to the minimum time period plus a predetermined delay period (e.g., $T_d$) and the duration of an on-time period (e.g., $T_{on}$) plus a demagnetization period (e.g., $T_{demag}$), a process 910 for closing (e.g., turning on) the switch 220 after the demagnetization period to start a next switching cycle, a process 912 for performing the next switching cycle, a process 914 for determining whether a valley is detected in the drain-source voltage of the switch 220 between the end of the minimum time period and the end of the maximum time period, a process 916 for closing (e.g., turning on) the switch 220 after the minimum time period to start a next switching cycle upon detecting a valley in the drain-source voltage of the switch 220 between the end of the minimum time period and the end of the maximum time period, and a process 918 for closing (e.g., turning on) the switch 220 after the maximum time period.

According to one embodiment, the switch 220 is closed (e.g., being turned on) at the process 902. For example, the timer component 522 is activated to count time at the process 904. In another example, an end of a minimum time period (e.g., $1/f_{max}$) is determined based on the time counted by the timer component 522 at the process 906. In yet another example, a maximum time period is determined as $T_{max} = T_{min} + T_d$, where $T_{min}$ represents the minimum time period and $T_d$ represents a predetermined delay period. In yet another example, at the process 908, the duration of a maximum time period is compared with the duration of an on-time period (e.g., $T_{on}$) plus a demagnetization period (e.g., $T_{demag}$). In yet another example, if the maximum time period ends earlier than the demagnetization period which follows the on-time period (e.g., as shown by the waveforms 802, 806 and 808 in FIG. 8(A)), the switch 220 is closed (e.g., being turned on) after the demagnetization period to start a next switching cycle, at the process 910. In yet another example, the next switching cycle is performed at the process 912.

According to another embodiment, if the maximum time period ends later than the demagnetization period, whether a valley is detected in the drain-source voltage of the switch 220 between the end of the minimum time period and the end of the maximum time period is determined at the process 914. For example, if a valley is detected (e.g., as shown by the waveforms 810, 814 and 816 in FIG. 8(B)), the switch 220 is closed (e.g., being turned on) after the minimum time period to start a next switching cycle at the process 916. In another example, if no valley is detected in the drain-source voltage of the switch 220 between the end of the minimum time period and the end of the maximum time period (e.g., as shown by the waveforms 818, 822 and 824 in FIG. 8(C)), the switch 220 is closed (e.g., being turned on) after the maximum time period to start a next switching cycle at the process 918.

According to another embodiment, a system controller for regulating a power conversion system includes a driving component and a detection component. The driving component is configured to output a driving signal to a switch associated with a first current flowing through a primary winding of a power conversion system, the switch including a first switch terminal related to a first voltage and a second switch terminal related to a second voltage, the driving signal being associated with a plurality of switching periods including a first switching period and a second switching period. The detection component is configured to receive an input signal associated with a difference between the first voltage and the second voltage, detect at least one valley of the input signal in magnitude during a detection period for the first switching period, and output a detection signal based on at least information associated with the input signal to affect the driving signal. The driving component is further configured to, in response to the detection component detecting the valley of the input signal during the detection period for the first switching period, change the driving signal during the detection period to end the first switching period and start the second switching period, the second switching period following the first switching period. The detection period begins at the end of a first predetermined time period and ends at the end of a second predetermined time period, the second predetermined time period being larger in duration than the first predetermined time period. For example, the system controller is implemented according to at least FIG. 2, FIG. 3(A), FIG. 3(B), FIG. 3(C), FIG. 3(D), FIG. 4(A), FIG. 4(B), FIG. 4(C), FIG. 4(D), FIG. 5, FIG. 6(A), FIG. 6(B), FIG. 6(C), FIG. 6(D), FIG. 7(A), FIG. 7(B), FIG. 7(C), FIG. 7(D), FIG. 8(B), and/or FIG. 9.

According to another embodiment, a system controller for regulating a power conversion system includes a current-control component and a driving component. The current-control component is configured to receive a current-sensing signal associated with a first current flowing through a primary winding of a power conversion system and a first signal associated with an output current of the power conversion system and output one or more second signals based on at least information associated with the current-sensing signal and the first signal. The driving component is configured to generate a driving signal based on at least information associated with the one or more second signals and output the driving signal to a switch to affect the first current, the driving signal being related to one or more switching periods. The current-control component and the driving component are further configured to, in response to the first signal indicating the output current increases in magnitude, change the driving signal to affect the first current in order to decrease one or more peak magnitudes of the current-sensing signal corresponding to the one or more switching periods respectively. In addition, the current-control component and the driving component are configured to, in response to the first signal indicating the output current decreases in magnitude, change the driving signal to affect the first current in order to increase the one or more peak magnitudes of the current-sensing signal corresponding to the one or more switching periods respectively. For example, the system controller is implemented according to at least FIG. 2, FIG. 4(B), FIG. 4(D), FIG. 5, FIG. 7(B), and/or FIG. 7(D).

According to yet another embodiment, a system controller for regulating a power conversion system includes a driving component and a detection component. The driving component is configured to output a driving signal to a switch associated with a first current flowing through a primary winding of a power conversion system, the switch including a first switch terminal related to a first voltage and a second switch terminal related to a second voltage, the driving signal being associated with a plurality of switching periods including a first switching period and a second switching period, the first switching period including an on-time period and a demagnetization period following the on-time period. The detection component is configured to receive an input signal associated with a difference between the first voltage and the second voltage, process information associated with the input signal, and output a detection signal based on at least information associated with the input signal to affect the driving signal. The driving component is further configured to, in response to the detection component detecting a valley of the input signal during a detection period for the first switching period, change the driving signal during the detection period to end the first switching period and start the second switching period, the second switching period following the first switching period. The driving component is further configured to, in response to the detection component not detecting the valley of the input signal during the detection period for the first switching period, change the driving signal at the end of the detection period to end the first switching period and start the second switching period. The driving component is further configured to, in response to the detection period ending before the demagnetization period ends, change the driving signal at the end of the demagnetization period to end the first switching period and start the second switching period. For example, the system controller is implemented according to at least FIG. 2, FIG. 3(A), FIG. 3(B), FIG. 3(C), FIG. 3(D), FIG. 4(A), FIG. 4(B), FIG. 4(C), FIG. 4(D), FIG. 5, FIG. 6(A), FIG. 6(B), FIG. 6(C), FIG. 6(D), FIG. 7(A), FIG. 7(B), FIG. 7(C), FIG. 7(D), FIG. 8(A), FIG. 8(B), FIG. 8(C), and/or FIG. 9.

In one embodiment, a method for regulating a power conversion system includes, outputting a driving signal to a switch associated with a first current flowing through a primary winding of a power conversion system, the switch including a first switch terminal related to a first voltage and a second switch terminal related to a second voltage, the driving signal being associated with a plurality of switching periods including a first switching period and a second switching period, receiving an input signal associated with a difference between the first voltage and the second voltage, and processing information associated with the input signal. The method further includes, detecting at least one valley of the input signal in magnitude during a detection period for the first switching period, and outputting a detection signal based on at least information associated with the input signal to affect the driving signal. The outputting a driving signal to a switch associated with a first current flowing through a primary winding of a power conversion system includes, in response to detecting the valley of the input signal during the detection period for the first switching period, changing the driving signal during the detection period to end the first switching period and start the second switching period, the second switching period following the first switching period. The detection period begins at the end of a first predetermined time period and ends at the end of a second predetermined time period, the second predetermined time period being larger in duration than the first predetermined time period. For example, the method is implemented according to at least FIG. 2, FIG. 3(A), FIG. 3(B), FIG. 3(C), FIG. 3(D), FIG. 4(A), FIG. 4(B), FIG. 4(C), FIG. 4(D), FIG. 5, FIG. 6(A), FIG. 6(B), FIG. 6(C), FIG. 6(D), FIG. 7(A), FIG. 7(B), FIG. 7(C), FIG. 7(D), FIG. 8(B), and/or FIG. 9.

In another embodiment, a method for regulating a power conversion system includes, receiving a current-sensing signal associated with a first current flowing through a primary winding of a power conversion system and a first signal associated with an output current of the power conversion system, processing information associated with the current-sensing signal, and outputting one or more second signals based on at least information associated with the current-sensing signal and the first signal. The method includes, generating a driving signal based on at least information associated with the one or more second signals, and outputting the driving signal to a switch to affect the first current, the driving signal being related to one or more switching periods. The outputting the driving signal to a switch to affect the first current includes, in response to the first signal indicating the output current increases in magnitude, changing the driving signal to affect the first current in order to decrease one or more peak magnitudes of the current-sensing signal corresponding to the one or more switching periods respectively, and in response to the first signal indicating the output current decreases in magnitude, changing the driving signal to affect the first current in order to increase the one or more peak magnitudes of the current-sensing signal corresponding to the one or more switching periods respectively. For example, the method is implemented according to at least FIG. 2, FIG. 4(B), FIG. 4(D), FIG. 5, FIG. 7(B), and/or FIG. 7(D).

In yet another embodiment, a method for regulating a power conversion system includes, outputting a driving signal to a switch associated with a first current flowing through a primary winding of a power conversion system, the switch including a first switch terminal related to a first voltage and a second switch terminal related to a second voltage, the driving signal being associated with a plurality of switching periods including a first switching period and a second switching period, the first switching period including an on-time period and a demagnetization period following the on-time period, receiving an input signal associated with a difference between the first voltage and the second voltage, processing information associated with the input signal, and outputting a detection signal based on at least information associated with the input signal to affect the driving signal. The outputting a driving signal to a switch associated with a first current flowing through a primary winding of a power conversion system includes, in response to detecting a valley of the input signal during a detection period for the first switching period, changing the driving signal during the detection period to end the first switching period and start the second switching period, the second switching period following the first switching period, in response to not detecting the valley of the input signal during the detection period for the first switching period, changing the driving signal at the end of the detection period to end the first switching period and start the second switching period, and in response to the detection period endings before the demagnetization period ends, changing the driving signal at the end of the demagnetization period to end the first switching period and start the second switching period. For example, the method is implemented according to at least FIG. 2, FIG. 3(A), FIG. 3(B), FIG. 3(C), FIG. 3(D), FIG. 4(A), FIG. 4(B), FIG. 4(C), FIG. 4(D), FIG. 5, FIG. 6(A), FIG. 6(B), FIG. 6(C), FIG. 6(D), FIG. 7(A), FIG. 7(B), FIG. 7(C), FIG. 7(D), FIG. 8(A), FIG. 8(B), FIG. 8(C), and/or FIG. 9.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims

What is claimed is:

1. A system controller for regulating a power conversion system, the system controller comprising:
  a detector configured to detect at least one valley in an input signal in magnitude during a detection period for a first switching period, and output a detection signal based at least in part on the input signal to affect a driving signal to a switch, the switch being associated with a first current flowing through a primary winding of the power conversion system;
  wherein:
    the switch includes a first switch terminal related to a first voltage and a second switch terminal related to a second voltage;
    the driving signal is associated with a plurality of switching periods including the first switching period and a second switching period, the second switching period following the first switching period;
    the at least one valley in the input signal includes a valley associated with a difference between the first voltage and the second voltage in magnitude; and
    the detection period begins at an end of a first predetermined time period and ends at an end of a second predetermined time period, the second predetermined time period being larger in duration than the first predetermined time period.

2. The system controller of claim 1 wherein:
  the switch includes a transistor including a drain terminal and a source terminal;
  the first switch terminal corresponds to the drain terminal; and
  the second switch terminal corresponds to the source terminal.

3. The system controller of claim 1 wherein:
  the first switching period ends at a first time; and
  the second switching period starts at the first time.

4. The system controller of claim 1 wherein a duration of the first predetermined time period is constant.

5. The system controller of claim 1 wherein a duration of the first predetermined time period is not constant.

6. The system controller of claim 1 wherein a duration of the second predetermined time period is constant.

7. The system controller of claim 1 wherein a duration of the second predetermined time period is not constant.

8. The system controller of claim 1 wherein the first predetermined time period, the second predetermined time period and the first switching period start at a same time.

9. The system controller of claim 1 wherein the first switching period includes an on-time period and a demagnetization period associated with a demagnetization process of the power conversion system, the demagnetization period following the on-time period.

10. The system controller of claim 9 wherein the system controller is configured to, in response to the demagnetization period ending after an end of the detection period, change the driving signal to end the first switching period and start the second switching period after the demagnetization period.

11. The system controller of claim 1 wherein the system controller is configured to, in response to the detector detecting no valley in the input signal during the detection period for the first switching period, change the driving signal to start the second switching period after the second predetermined time period.

12. The system controller of claim 1, further comprising a timer configured to generate, at a beginning of the first switching period, a pulse signal associated with the first predetermined time period.

13. The system controller of claim 12, further comprising an error amplifier configured to receive a first signal associated with an output signal of the power conversion system and a second signal and output an amplified signal to the timer based at least in part on the first signal and the second signal.

14. The system controller of claim 12 wherein the pulse signal is associated with a pulse width, the pulse width being proportional to a duration of the first predetermined time period.

15. The system controller of claim 1 wherein a duration of the first predetermined time period is inversely proportional to a maximum frequency value.

16. The system controller of claim 15 wherein a duration of the second predetermined time period is inversely proportional to a minimum frequency value.

17. The system controller of claim 16 wherein the first switching period includes an on-time period and a demagnetization period following the on-time period.

18. The system controller of claim 17 wherein the system controller is further configured to, in response to the duration of the second predetermined time period being smaller than a sum of a duration of the on-time period and a duration of the demagnetization period, change the driving signal at an end of the demagnetization period to end the first switching period and start the second switching period.

19. A system controller for regulating a power conversion system, the system controller comprising:
  a current controller configured to receive a first signal associated with a first current flowing through a primary winding of the power conversion system and a second signal associated with an output current of the power conversion system;
  wherein the system controller is configured to:
    in response to the second signal indicating the output current increases in magnitude, change a driving signal to affect the first current in order to decrease one or more peak magnitudes of the first signal corresponding to one or more switching periods respectively, the driving signal being related to the one or more switching periods;
    in response to the second signal indicating the output current decreases in magnitude, change the driving signal to affect the first current in order to increase the one or more peak magnitudes of the first signal corresponding to the one or more switching periods respectively; and
    output the driving signal to a switch to affect the first current.

20. The system controller of claim 19 wherein the system controller is further configured to:
  in response to the second signal indicating the output current increases in magnitude and the output current increasing from a first magnitude to a second magnitude, change the driving signal to affect the first current to decrease the one or more peak magnitudes of the first signal; and
  in response to the second signal indicating the output current decreases in magnitude and the output current decreasing from a third magnitude to a fourth magnitude, the first magnitude being larger than the third magnitude, change the driving signal to affect the first current to increase the one or more peak magnitudes of the first signal.

21. The system controller of claim 20 wherein the first magnitude is approximately equal to the second magnitude.

22. The system controller of claim 20 wherein the third magnitude is approximately equal to the fourth magnitude.

23. A system controller for regulating a power conversion system, the system controller comprising:
  a detector configured to receive an input signal associated with a difference between a first voltage and a second voltage, and output a detection signal based at least in part on the input signal to affect a driving signal to a switch associated with a first current flowing through a primary winding of the power conversion system, the switch including a first switch terminal related to the first voltage and a second switch terminal related to the second voltage, the driving signal being associated with a plurality of switching periods including a first switching period and a second switching period, the first switching period including an on-time period and a demagnetization period following the on-time period;
  wherein the system controller is configured to:
    in response to the detector detecting a valley of the input signal during a detection period for the first switching period, change the driving signal during the detection period to end the first switching period and start the second switching period, the second switching period following the first switching period;
    in response to the detector not detecting the valley of the input signal during the detection period for the first switching period, change the driving signal at the end of the detection period to end the first switching period and start the second switching period; and
    in response to the detection period ending before the demagnetization period ends, change the driving signal at an end of the demagnetization period to end the first switching period and start the second switching period.

24. The system controller of claim 23 wherein the detection period begins at an end of a first predetermined time period and ends at an end of a second predetermined time period, the second predetermined time period being larger in duration than the first predetermined time period.

25. The system controller of claim 24, further comprising a timer configured to generate, at the beginning of the first switching period, a pulse signal associated with the first predetermined time period.

26. The system controller of claim 25 wherein the pulse signal is associated with a pulse width, the pulse width being proportional to a duration of the first predetermined time period.

27. A method for regulating a power conversion system, the method comprising:
  detecting at least one valley of an input signal in magnitude during a detection period for a first switching period; and
  outputting a detection signal based at least in part on the input signal to affect a driving signal to a switch, the switch being associated with a first current flowing through a primary winding of the power conversion system;
  wherein:
    the switch includes a first switch terminal related to a first voltage and a second switch terminal related to a second voltage;
    the driving signal is associated with a plurality of switching periods including the first switching period and a second switching period, the second switching period following the first switching period;
    the at least one valley in the input signal includes a valley associated with a difference between the first voltage and the second voltage in magnitude; and
    the detection period begins at an end of a first predetermined time period and ends at an end of a second predetermined time period, the second predetermined time period being larger in duration than the first predetermined time period.

28. The method of claim 27 wherein the first predetermined time period, the second predetermined time period and the first switching period start at a same time.

29. The method of claim 27 wherein the first switching period includes an on-time period and a demagnetization period associated with a demagnetization process of the power conversion system, the demagnetization period following the on-time period.

30. The method of claim 29, further comprising, in response to the demagnetization period ending after an end of the detection period, changing the driving signal to end the first switching period and start the second switching period after the demagnetization period.

31. The method of claim 29, further comprising, in response to the duration of the second predetermined time period being smaller than a sum of a duration of the on-time period and a duration of the demagnetization period, changing the driving signal at an end of the demagnetization period to end the first switching period and start the second switching period.

32. The method of claim 27, further comprising, in response to detecting the at least one valley of the input signal in magnitude during the detection period for the first switching period, changing the driving signal during the detection period to end the first switching period and start the second switching period.

33. The method of claim 27, further comprising generating, at a beginning of the first switching period, a pulse signal associated with the first predetermined time period, wherein the pulse signal is associated with a pulse width, the pulse width being proportional to a duration of the first predetermined time period.

34. The method of claim 27 wherein a duration of the first predetermined time period is inversely proportional to a maximum frequency value and a duration of the second predetermined time period is inversely proportional to a minimum frequency value.

35. A method for regulating a power conversion system, the method comprising:
receiving a first signal associated with a first current flowing through a primary winding of the power conversion system and a second signal associated with an output current of the power conversion system;
in response to the second signal indicating the output current increases in magnitude, changing a driving signal to affect the first current in order to decrease one or more peak magnitudes of the first signal corresponding to one or more switching periods respectively, the driving signal being related to the one or more switching periods;
in response to the second signal indicating the output current decreases in magnitude, changing the driving signal to affect the first current in order to increase the one or more peak magnitudes of the first signal corresponding to the one or more switching periods respectively; and
outputting the driving signal to a switch to affect the first current.

36. The method of claim 35, further comprising:
in response to the second signal indicating the output current increases in magnitude and the output current increasing from a first magnitude to a second magnitude, changing the driving signal to affect the first current to decrease the one or more peak magnitudes of the first signal; and
in response to the second signal indicating the output current decreases in magnitude and the output current decreasing from a third magnitude to a fourth magnitude, the first magnitude being larger than the third magnitude, changing the driving signal to affect the first current to increase the one or more peak magnitudes of the first signal.

37. The method of claim 36 wherein the first magnitude is approximately equal to the second magnitude.

38. The method of claim 36 wherein the third magnitude is approximately equal to the fourth magnitude.

39. A method for regulating a power conversion system, the method comprising:
receiving an input signal associated with a difference between a first voltage and a second voltage;
outputting a detection signal based at least in part on the input signal to affect a driving signal to a switch associated with a first current flowing through a primary winding of the power conversion system, the switch including a first switch terminal related to the first voltage and a second switch terminal related to the second voltage, the driving signal being associated with a plurality of switching periods including a first switching period and a second switching period, the first switching period including an on-time period and a demagnetization period following the on-time period;
in response to detecting a valley of the input signal during a detection period for the first switching period, changing the driving signal during the detection period to end the first switching period and start the second switching period, the second switching period following the first switching period;
in response to not detecting the valley of the input signal during the detection period for the first switching period, changing the driving signal at an end of the detection period to end the first switching period and start the second switching period; and
in response to the detection period ending before the demagnetization period ends, changing the driving signal at an end of the demagnetization period to end the first switching period and start the second switching period.

40. The method of claim 39 wherein the detection period begins at an end of a first predetermined time period and ends at an end of a second predetermined time period, the second predetermined time period being larger in duration than the first predetermined time period.

41. The method of claim 40, further comprising generating, at the beginning of the first switching period, a pulse signal associated with the first predetermined time period.

42. The method of claim 41 wherein the pulse signal is associated with a pulse width, the pulse width being proportional to a duration of the first predetermined time period.

* * * * *